United States Patent
Ichino et al.

(10) Patent No.: US 12,142,079 B2
(45) Date of Patent: Nov. 12, 2024

(54) FEATURE CONVERSION LEARNING DEVICE, AUTHENTICATION DEVICE, FEATURE CONVERSION LEARNING METHOD, AUTHENTICATION METHOD, AND RECORDING MEDIUM

(71) Applicants: NEC Corporation, Tokyo (JP); The University of Electro-Communications, Chofu (JP)

(72) Inventors: Masatsugu Ichino, Chofu (JP); Daisuke Uenoyama, Chofu (JP); Tsubasa Boura, Chofu (JP); Takahiro Toizumi, Tokyo (JP); Masato Tsukada, Tokyo (JP); Yuka Ogino, Tokyo (JP)

(73) Assignees: NEC CORPORATION, Tokyo (JP); THE UNIVERSITY OF ELECTRO-COMMUNICATIONS, Tokyo (JP)

( * ) Notice: Subject to any disclaimer, the term of this patent is extended or adjusted under 35 U.S.C. 154(b) by 326 days.

(21) Appl. No.: 17/636,074

(22) PCT Filed: Mar. 18, 2021

(86) PCT No.: PCT/JP2021/011192
§ 371 (c)(1),
(2) Date: Feb. 17, 2022

(87) PCT Pub. No.: WO2022/195819
PCT Pub. Date: Sep. 22, 2022

(65) Prior Publication Data
US 2023/0360440 A1    Nov. 9, 2023

(51) Int. Cl.
G06V 40/18    (2022.01)
G06T 3/40    (2006.01)
(Continued)

(52) U.S. Cl.
CPC ............ *G06V 40/193* (2022.01); *G06T 3/40* (2013.01); *G06V 10/7715* (2022.01); *G06V 10/774* (2022.01); *G06V 10/776* (2022.01)

(58) Field of Classification Search
CPC ............ G06V 40/193; G06V 10/7715; G06V 10/774; G06V 10/776; G06V 40/197;
(Continued)

(56) References Cited

U.S. PATENT DOCUMENTS

| 2009/0220156 A1* | 9/2009 | Ito ..................... G06V 40/165 382/201 |
| 2011/0052045 A1* | 3/2011 | Kameyama ............ G06T 7/75 382/154 |

(Continued)

FOREIGN PATENT DOCUMENTS

| JP | 2004-021491 A | 1/2004 |
| JP | 2007-036836 A | 2/2007 |

(Continued)

OTHER PUBLICATIONS

International Search Report of PCT/JP2021/011192 dated May 11, 2021 [PCT/ISA/210].

*Primary Examiner* — Md K Talukder
(74) *Attorney, Agent, or Firm* — Sughrue Mion, PLLC

(57) ABSTRACT

A feature conversion learning device is configured to acquire a first image, reduce the first image to a second image having lower resolution than the first image, enlarge the second image to a third image having the same resolution as the first image, extract a first feature that is a feature of the first image and a second feature, convert the second feature into a third feature, and learn a feature conversion method based on a result of comparing the first feature with the third feature.

9 Claims, 20 Drawing Sheets

(51) Int. Cl.
*G06V 10/77* (2022.01)
*G06V 10/774* (2022.01)
*G06V 10/776* (2022.01)

(58) Field of Classification Search
CPC ......... G06V 10/82; G06T 3/40; G06T 3/4053; G06T 7/00
See application file for complete search history.

(56) References Cited

U.S. PATENT DOCUMENTS

| | | | | |
|---|---|---|---|---|
| 2011/0135192 | A1* | 6/2011 | Yokono | G06V 10/774 382/160 |
| 2017/0140506 | A1* | 5/2017 | Sato | G06T 3/4053 |
| 2022/0114837 | A1* | 4/2022 | Yamamoto | G06V 10/757 |
| 2023/0360440 | A1* | 11/2023 | Ichino | G06T 7/00 |

FOREIGN PATENT DOCUMENTS

| | | |
|---|---|---|
| JP | 2008-299618 A | 12/2008 |
| JP | 2013-031163 A | 2/2013 |
| JP | 2020-144700 A | 9/2020 |
| WO | 2016/002068 A1 | 1/2016 |

\* cited by examiner

FEATURE CONVERSION LEARNING DEVICE, AUTHENTICATION DEVICE, FEATURE CONVERSION LEARNING METHOD, AUTHENTICATION METHOD, AND RECORDING MEDIUM

CROSS REFERENCE TO RELATED APPLICATIONS

This application is a National Stage of International Application No. PCT/JP2021/011192 filed on Mar. 18, 2021.

TECHNICAL FIELD

The present disclosure relates to a feature conversion learning device, an authentication device, a feature conversion learning method, an authentication method, and a recording medium.

BACKGROUND ART

Technology for performing conversion into an image having higher resolution than an original image is called Super Resolution (for example, see Patent Document 1).

CITATION LIST

Patent Document

[Patent Document 1]
Japanese Unexamined Patent Application, First Publication No. 2013-31163

SUMMARY OF INVENTION

Technical Problem

A case where the resolution of an image of an authentication target is insufficient such as a case where iris authentication is performed using a face image is considered. In this case, it is conceivable to convert an image of an authentication target into a higher-resolution image using Super Resolution and use the higher-resolution image for authentication. However, because it is necessary to generate a high-resolution image, there is a possibility that the Super Resolution will incur a high calculation cost.

An example of object of the present disclosure is to provide a feature conversion learning device, an authentication device, a feature conversion learning method, an authentication method, and a recording medium capable of solving the above-mentioned problems.

Solution to Problem

According to a first example aspect of the present disclosure, a feature conversion learning device includes an image acquisition means configured to acquire a first image; an image reduction means configured to reduce the first image to a second image having lower resolution than the first image; an image enlargement means configured to enlarge the second image to a third image having the same resolution as the first image; a feature extraction means configured to extract a first feature that is a feature of the first image and a second feature that is a feature of the third image; a feature conversion means configured to convert the second feature into a third feature; and a learning control means configured to cause the feature conversion means to learn a feature conversion method based on a result of comparing the first feature with the third feature.

According to a second example aspect of the present disclosure, an authentication device includes an authentication target image acquisition means configured to acquire an authentication target image; an image enlargement means configured to enlarge the authentication target image; a feature extraction means configured to extract a feature of an image obtained by enlarging the authentication target image in a method that is the same as a feature extraction method for a comparative image having higher resolution than the authentication target image; a feature conversion means configured to convert the feature of the image obtained by enlarging the authentication target image based on a result of learning a feature conversion method using a loss function whose value decreases as a difference between a feature after conversion from a feature of a learning image and a feature of a deteriorated image enlarged after the learning image is reduced decreases; and a feature comparison means configured to compare a feature after conversion by the feature conversion means with a feature of the comparative image.

According to a third example aspect of the present disclosure, a feature conversion learning method includes acquiring a first image; reducing the first image to a second image having lower resolution than the first image; enlarging the second image to a third image having the same resolution as the first image; extracting a first feature that is a feature of the first image and a second feature that is a feature of the third image; converting the second feature into a third feature; and learning a feature conversion method of converting the second feature into the third feature based on a result of comparing the first feature with the third feature.

According to a fourth example aspect of the present disclosure, an authentication method includes acquiring an authentication target image; enlarging the authentication target image; extracting a feature of an image obtained by enlarging the authentication target image in a method that is the same as a feature extraction method for a comparative image having higher resolution than the authentication target image; converting the feature of the image obtained by enlarging the authentication target image based on a result of learning a feature conversion method using a loss function whose value decreases as a difference between a feature after conversion from a feature of a learning image and a feature of a deteriorated image enlarged after the learning image is reduced decreases; and comparing a feature after conversion from the feature of the image obtained by enlarging the authentication target image with a feature of the comparative image.

According to a fifth example aspect of the present disclosure, there is provided a recording medium recording a program for causing a computer to: acquire a first image; reduce the first image to a second image having lower resolution than the first image; enlarge the second image to a third image having the same resolution as the first image; extract a first feature that is a feature of the first image and a second feature that is a feature of the third image; convert the second feature into a third feature; and learn a feature conversion method of converting the second feature into the third feature based on a result of comparing the first feature with the third feature.

According to a sixth example aspect of the present disclosure, there is provided a recording medium recording a program for causing a computer to: acquire an authentication target image; enlarge the authentication target image; extract a feature of an image obtained by enlarging the authentication target image in a method that is the same as a feature extraction method for a comparative image having higher resolution than the authentication target image; convert the feature of the image obtained by enlarging the authentication target image based on a result of learning a feature conversion method using a loss function whose value decreases as a difference between a feature after conversion from a feature of a learning image and a feature of a deteriorated image enlarged after the learning image is reduced decreases; and compare a feature after conversion from the feature of the image obtained by enlarging the authentication target image with a feature of the comparative image.

EXAMPLE EMBODIMENT

First Example Embodiment

Figure 1:
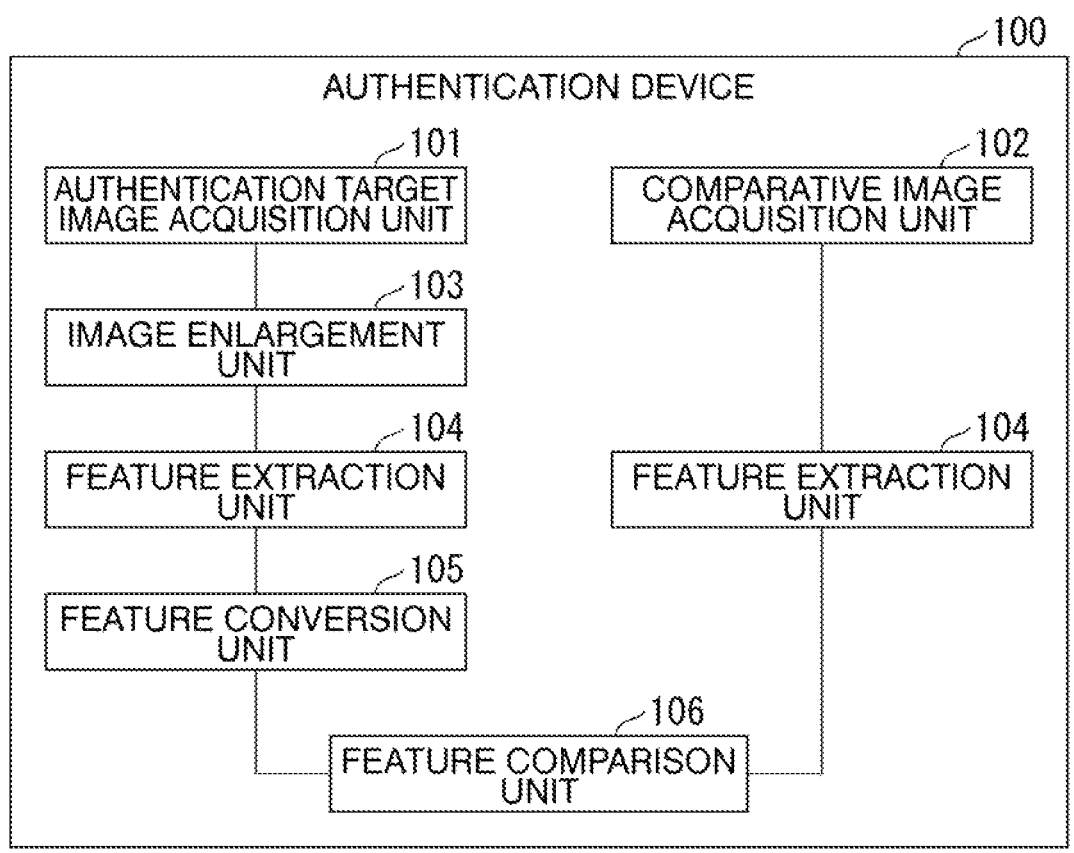
FIG. 1 is a diagram showing an example of a configuration of an authentication device according to a first example embodiment.

FIG. 1 is a diagram showing an example of a configuration of an authentication device according to a first example embodiment. In the configuration shown in FIG. 1, an authentication device 100 includes an authentication target image acquisition unit 101, a comparative image acquisition unit 102, an image enlargement unit 103, a feature extraction unit 104, a feature conversion unit 105, and a feature comparison unit 106.

The authentication device 100 extracts a feature of an image and performs authentication using the extracted feature. Hereinafter, a case where the authentication device 100 performs iris authentication using a low-resolution image will be described as an example. However, the authentication performed by the authentication device 100 is not limited to the iris authentication.

It is assumed that resolution levels of two images are compared in a state in which sizes of the images are aligned.

The authentication target image acquisition unit 101 acquires an acquired image of an eye of an authentication target person as an authentication target image. The authentication target image acquisition unit 101 corresponds to an example of an authentication target image acquisition means.

The comparative image acquisition unit 102 acquires a comparative image to be compared with the authentication target image. The comparative image may be registered in the authentication device 100 in advance.

Here, it is assumed that the authentication target image has lower resolution than the comparative image.

For example, the authentication target image may be an image of a part of an eye within the image of the entire face of the authentication target person. On the other hand, the comparative image may be an acquired image of only the part of the eye for the iris authentication. In this way, if the iris authentication can be performed using the image of the part of the eye within the image of the entire face, the accuracy of authentication can be improved by performing both face authentication and iris authentication.

The image enlargement unit 103 enlarges the authentication target image that is a low-resolution image. The image enlargement unit 103 corresponds to an example of an image enlargement means. The enlarged authentication target image is also referred to as an image obtained by enlarging the authentication target image or simply an enlarged image.

The feature extraction unit 104 extracts a feature of the authentication target image in a method that is the same as a feature extraction method for the comparative image.

The feature extraction unit 104 extracts a feature of the enlarged authentication target image and a feature of the comparative image. The feature extraction unit 104 extracts the feature quantities by applying the same algorithm to the enlarged authentication target image and the comparative image. The authentication device 100 may be configured to include two feature extraction units 104 that are the same as each other. Alternatively, one feature extraction unit 104 may be configured to extract the feature of the enlarged authentication target image and the feature of the comparative image according to, for example, time division processing or the like. Also, the feature of the comparative image may be registered in the authentication device 100 in advance in a process in which the feature extraction unit 104 extracts the feature of the comparative image in advance or the like.

The feature extraction unit 104 corresponds to an example of a feature extraction means.

The feature conversion unit 105 converts the feature of the enlarged authentication target image. The feature conversion unit 105 converts the feature so that a difference between the feature of the enlarged authentication target image and a high-resolution feature becomes small. The feature conversion unit 105 corresponds to an example of a feature conversion means.

The conversion of the feature by the feature conversion unit 105 is also referred to as feature super-resolution. The feature after conversion by the feature conversion unit 105 is also referred to as a super-resolution feature.

The feature conversion unit 105 learns a feature conversion method through learning using a loss function whose value decreases as a difference between a feature of a learning image and a feature of a deteriorated image enlarged after the learning image is reduced decreases.

The feature comparison unit 106 compares the feature after conversion by the feature conversion unit 105 with the feature of the comparative image, and makes, for example, determination of whether or not a person of the authentication target image and a person of the comparative image are the same person.

The feature comparison unit 106 corresponds to an example of a feature comparison means.

Figure 2:
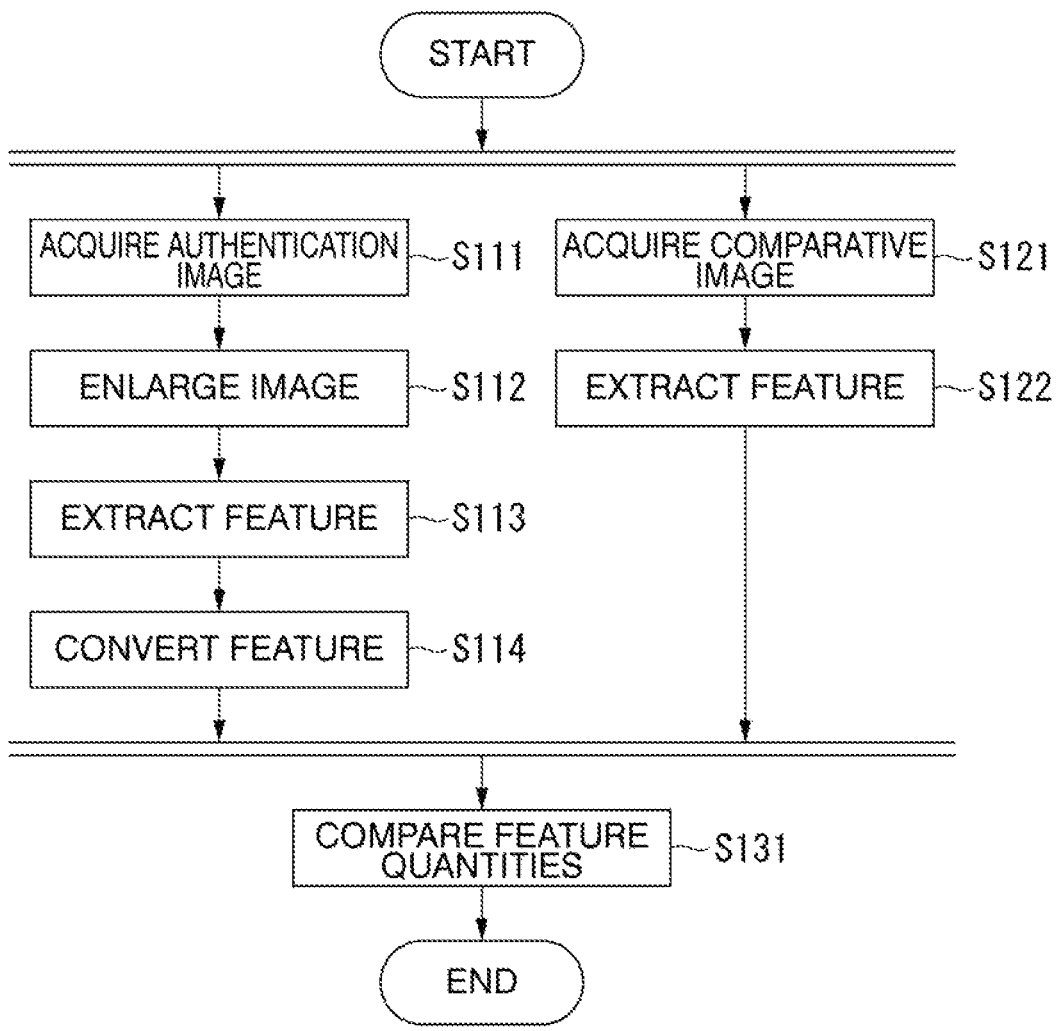
FIG. 2 is a flowchart showing an example of a processing procedure in which the authentication device according to the first example embodiment performs iris authentication.

FIG. 2 is a flowchart showing an example of a processing procedure in which the authentication device 100 performs the iris authentication.

In the process of FIG. 2, the authentication target image acquisition unit 101 acquires an authentication target image (step S111).

Subsequently, the image enlargement unit 103 enlarges the authentication target image by interpolating pixels of the authentication target image so that the authentication target image, which is a low-resolution image, has the same resolution as a comparative image, which is a high-resolution image (step S112). An algorithm in which the image enlargement unit 103 enlarges the image is not limited to a specific algorithm. For example, the image enlargement unit 103 may enlarge the image using a bicubic method or a bilinear method, but the present disclosure is not limited thereto.

The image enlarged by the image enlargement unit 103 is also referred to as an enlarged image.

Subsequently, the feature extraction unit 104 extracts a feature of the enlarged image (step S113). The feature extraction unit 104 may be a feature extractor in which learning for authentication on the basis of a high-resolution image has been completed, but the present disclosure is not limited thereto. The feature extraction unit 104 may be configured using a learned model on the basis of a deep neural network (DNN) such as a VGG or a residual network (ResNet). The feature extraction unit 104 may be configured to output a feature in the form of a one-dimensional vector. Alternatively, the feature extraction unit 104 may be configured to output a feature in the form of a two-dimensional or three-dimensional tensor that maintains image information.

Subsequently, the feature conversion unit 105 converts the feature of the enlarged image (step S114). The feature conversion unit 105 converts the feature of the enlarged image so that it can be compared with a feature of the high-resolution image.

Also, the comparative image acquisition unit 102 acquires a comparative image (step S121). The feature extraction unit 104 extracts a feature of the comparative image (step S122). As described above, the feature extraction unit 104 extracts the feature of the comparative image using an algorithm that is the same as that when the feature of the enlarged image is extracted.

Steps S111 to S114 and steps S121 to S122 may be executed in parallel. Alternatively, the processing of steps S121 to S122 may be performed in advance and the authentication device 100 may be configured to store the feature of the comparative image.

After steps S114 and S122, the feature comparison unit 106 compares the feature of the enlarged image with the feature of the comparative image (step S131). For example, the feature comparison unit 106 calculates a similarity between the feature of the enlarged image and the feature of the comparative image and determines that the person of the authentication target image is the same as the person of the comparative image when the similarity is greater than or equal to a predetermined threshold value. Methods of calculating the similarity which are used by the feature comparison unit 106 can be various methods in which a similarity of vectors or tensors can be calculated and are not limited to a specific method. For example, the feature comparison unit 106 may be configured to calculate a distance L2 or a cosine similarity between the feature of the enlarged image and the feature of the comparative image.

After step S131, the authentication device 100 ends the process of FIG. 2.

As described above, the authentication target image acquisition unit 101 acquires the authentication target image. The image enlargement unit 103 enlarges the authentication target image. The feature extraction unit 104 extracts the feature of the image obtained by enlarging the authentication target image in the method that is the same as the feature extraction method for the comparative image having higher resolution than the authentication target image. The feature conversion unit 105 converts the feature of the image obtained by enlarging the authentication target image on the basis of learning using a loss function whose value decreases as a difference between a feature of a learning image and a feature of a deteriorated image enlarged after the learning image is reduced decreases. The feature comparison unit 106 compares a feature after conversion by the feature conversion unit 105 with a feature of the comparative image.

According to the authentication device 100, a feature capable of being compared with the feature of the comparative image that is a high-resolution image can be obtained as a feature of an authentication target image that is a low-resolution image by enlarging a low-resolution image, extracting a feature, and generating a super-resolution feature. According to the authentication device 100, in this respect, authentication can be performed even if the input image is a low-resolution image.

Also, according to the feature conversion performed by the feature conversion unit 105, the feature is expected to be closer from the feature of the enlarged authentication target image to a feature when the authentication target image is captured at higher resolution. According to the authentication device 100, in this respect, the authentication is expected to be able to be performed with high accuracy.

Also, according to the authentication device 100, the iris authentication can be performed using a low-resolution image. Thereby, in the authentication device 100, the face authentication and the iris authentication can be used together using one face image without the need for a high-resolution camera, and improvement in the accuracy of authentication is expected.

Second Example Embodiment

Figure 3:
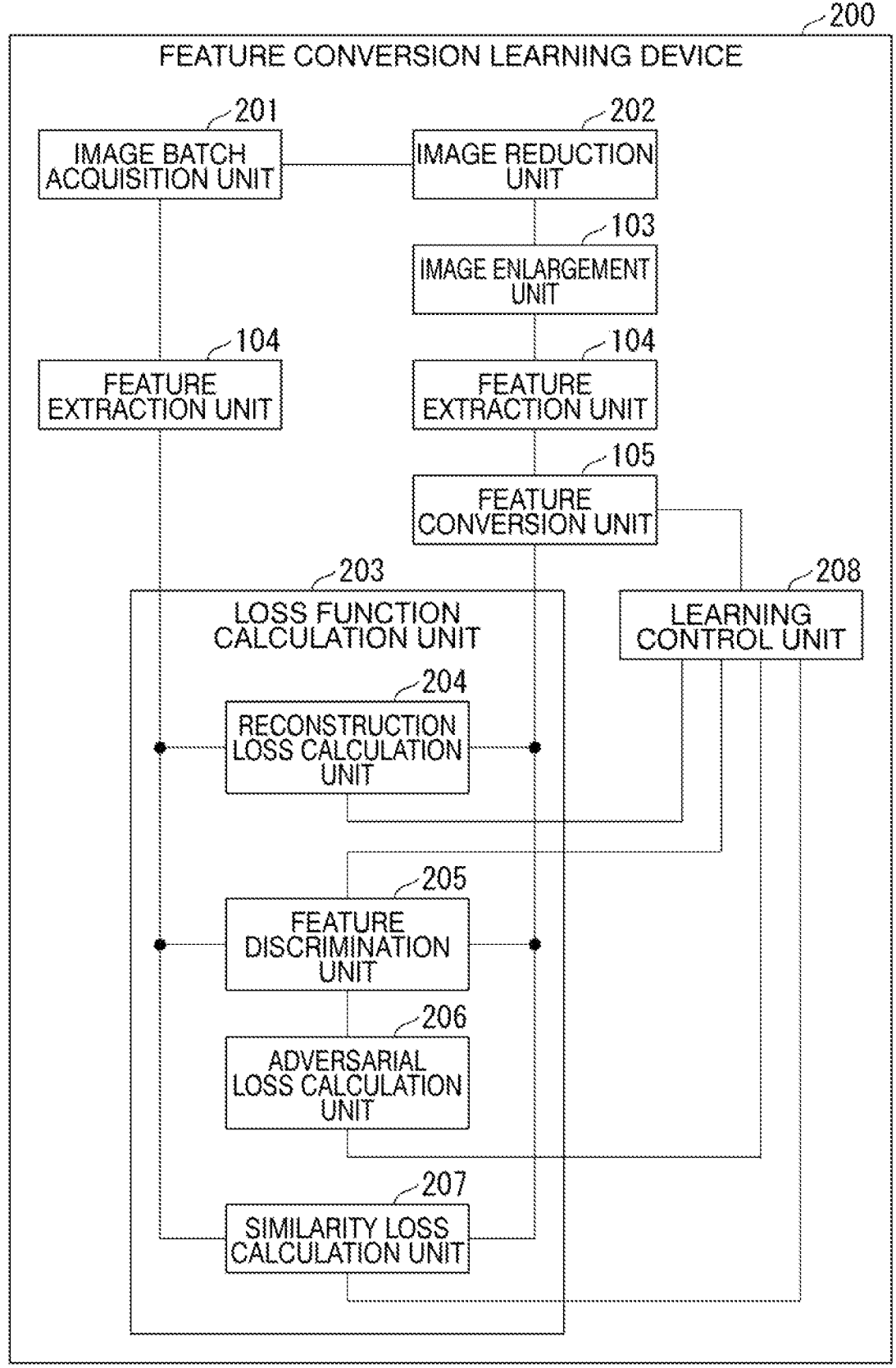
FIG. 3 is a diagram showing an example of a configuration of a feature conversion learning device according to a second example embodiment.

FIG. 3 is a diagram showing an example of a configuration of a feature conversion learning device according to a second example embodiment. In the configuration shown in FIG. 3, a feature conversion learning device 200 includes an image batch acquisition unit 201, an image reduction unit 202, an image enlargement unit 103, a feature extraction unit 104, a feature conversion unit 105, a loss function calculation unit 203, and a learning control unit 208. The loss function calculation unit 203 includes a reconstruction loss calculation unit 204, a feature discrimination unit 205, an adversarial loss calculation unit 206, and a similarity loss calculation unit 207.

Parts having similar functions in correspondence with the parts of FIG. 1 among parts of FIG. 3 are denoted by the same reference numerals (103, 104, and 105).

In the feature conversion learning device 200, a learning process of the feature conversion unit 105 is performed. The feature conversion unit 105 after learning can be used for an authentication device 100.

A model having an adjustment target parameter on the basis of learning is called a machine learning model. A parameter of the machine learning model is referred to as a machine learning model parameter and a parameter value of the machine learning model is referred to as a machine learning model parameter value. An adjustment to the machine learning model parameter value corresponds to learning.

Hereinafter, a case where the machine learning model of the feature conversion unit 105 is configured using a neural network will be described as an example. However, the configuration of the machine learning model of the feature conversion unit 105 is not limited to a specific one.

Also, in the following, a case where the feature conversion learning device 200 uses a loss function for learning will be described as an example. In this case, the feature conversion learning device 200 performs learning so that a loss function value becomes small.

However, the feature conversion learning device 200 may be configured to perform learning using an evaluation function in which a function value increases as an evaluation level increases. In this case, the feature conversion learning device 200 performs learning so that the evaluation function value becomes large.

The image batch acquisition unit 201 acquires a training dataset for use in the learning process of the feature conversion unit 105. Training data acquired by the image batch acquisition unit 201 includes a plurality of combinations of acquired images of a human eye and class labels indicating correct classes in a process of classifying classes of these images. The training dataset is also simply referred to as training data. Each combination of one image and one class label included in the training dataset is also referred to as a labeled image.

In the second example embodiment, the image acquired by the image batch acquisition unit 201 is also referred to as a high-resolution image.

The image batch acquisition unit 201 corresponds to an example of an image acquisition means. The high-resolution image acquired by the image batch acquisition unit 201 corresponds to an example of a first image.

The image reduction unit 202 reduces a high-resolution image. Pixels are thinned out according to image reduction performed by the image reduction unit 202 and hence the resolution becomes lower than that of the high-resolution image.

An image reduced by the image reduction unit 202 is referred to as a reduced image. The image reduction unit 202 may be configured to reduce an image by randomly determining a size or a reduction ratio of the reduced image using a random number.

The image reduction unit 202 corresponds to an example of an image reduction means. The reduced image corresponds to an example of a second image.

In the feature conversion learning device 200, the image enlargement unit 103 enlarges an image by a reduction ratio at which the image reduction unit 202 reduces an image. The image enlargement unit 103 enlarges the reduced image by interpolating pixels of the reduced image so that an image obtained by enlarging the reduced image as a low-resolution image has the same resolution as a high-resolution image. An image obtained by enlarging a reduced image in the image enlargement unit 103 is also referred to as a deteriorated image.

As described above, the image enlargement unit 103 corresponds to an example of an image enlargement means. The deteriorated image corresponds to an example of a third image.

In the feature conversion learning device 200, the feature extraction unit 104 extracts a feature of the high-resolution image and a feature of the deteriorated image using the same algorithm.

As described above, the feature extraction unit 104 corresponds to an example of a feature extraction means.

In the feature conversion learning device 200, the feature conversion unit 105 converts the feature of the deteriorated image. The feature conversion unit 105 converts the feature of the deteriorated image so that the feature is closer to the feature of the high-resolution image. As in the case of the first example embodiment, a feature after conversion by the feature conversion unit 105 is also referred to as a super-resolution feature.

As described above, the feature conversion unit 105 corresponds to an example of a feature conversion means.

The loss function calculation unit 203 calculates a loss function for a learning process of the feature conversion unit 105. The loss function calculation unit 203 corresponds to an example of a loss function calculation means.

The reconstruction loss calculation unit 204 calculates a reconstruction loss. The reconstruction loss is a loss whose value decreases as a similarity between a feature of a high-resolution image and a super-resolution feature as a vector or a tensor increases. In the loss function calculation unit 203, the reconstruction loss corresponds to an example of an index value of the similarity between the feature of the high-resolution image and the super-resolution feature. A total loss function using the reconstruction loss as one of variables corresponds to an example of a loss function in which a loss decreases as the similarity between the feature of the high-resolution image and the super-resolution feature increases.

The feature discrimination unit 205 discriminates between the feature of the high-resolution image and the super-resolution feature. Specifically, the feature discrimination unit 205 receives an input of a feature and determines whether the input feature is the feature of the high-resolution image or the super-resolution feature. The feature discrimination unit 205 is also configured to be able to perform a learning process. For example, a machine learning model of the feature discrimination unit 205 may be configured using a neural network.

The feature discrimination unit 205 corresponds to an example of a feature discrimination means.

The adversarial loss calculation unit 206 calculates a loss for a learning process of the feature conversion unit 105 and a loss for a learning process of the feature discrimination unit 205 on the basis of a discrimination result (a determination result) of the feature discrimination unit 205. The loss for the learning process of the feature conversion unit 105 is also referred to as the loss of the feature conversion unit 105. The loss for the learning process of the feature discrimination unit 205 is also referred to as the loss of the feature discrimination unit 205.

The learning process of the feature conversion unit 105 and the learning process of the feature discrimination unit 205 are alternately performed in learning on the basis of one batch in accordance with the control of the learning control unit 208.

In the learning process of the feature conversion unit 105, the adversarial loss calculation unit 206 calculates an adversarial loss. The adversarial loss mentioned here is a loss whose value decreases when the feature discrimination unit 205 erroneously determines the super-resolution feature as the feature of the high-resolution image. The total loss function using the adversarial loss as one of the variables corresponds to an example of a loss function in which a loss decreases when the feature discrimination unit 205 cannot distinguish between the feature converted by the feature conversion unit 105 and another feature.

On the other hand, in the learning process of the feature discrimination unit 205, the adversarial loss calculation unit 206 calculates the loss whose value decreases when the feature discrimination unit 205 correctly discriminates between the super-resolution feature and the feature of the high-resolution image.

The similarity loss calculation unit 207 calculates a similarity loss. The similarity loss is a loss whose value decreases when a class of a classification result matches a correct class in a class classification process using a super-resolution feature. The total loss function using the similarity loss as one of variables corresponds to an example of a loss function in which a loss decreases when the class according to the class classification process on the basis of the super-resolution feature matches the correct class.

The learning control unit 208 updates a machine learning model parameter value of each of the feature conversion unit 105 and the feature discrimination unit 205 using the loss calculated by the loss function calculation unit 203. The learning control unit 208 corresponds to an example of a learning control means. The learning control unit 208 adjusts a machine learning model parameter value for conversion into the feature by the feature conversion unit 105 using the loss calculated by the loss function calculation unit 203. In this respect, the learning control unit 208 causes the feature conversion unit 105 to learn a feature conversion method on the basis of the loss function. The update of the machine learning model parameter value of the feature conversion unit 105 corresponds to the learning process of the feature conversion unit 105. The update of the machine learning model parameter value of the feature discrimination unit 205 corresponds to the learning process of the feature discrimination unit 205.

Figure 4:
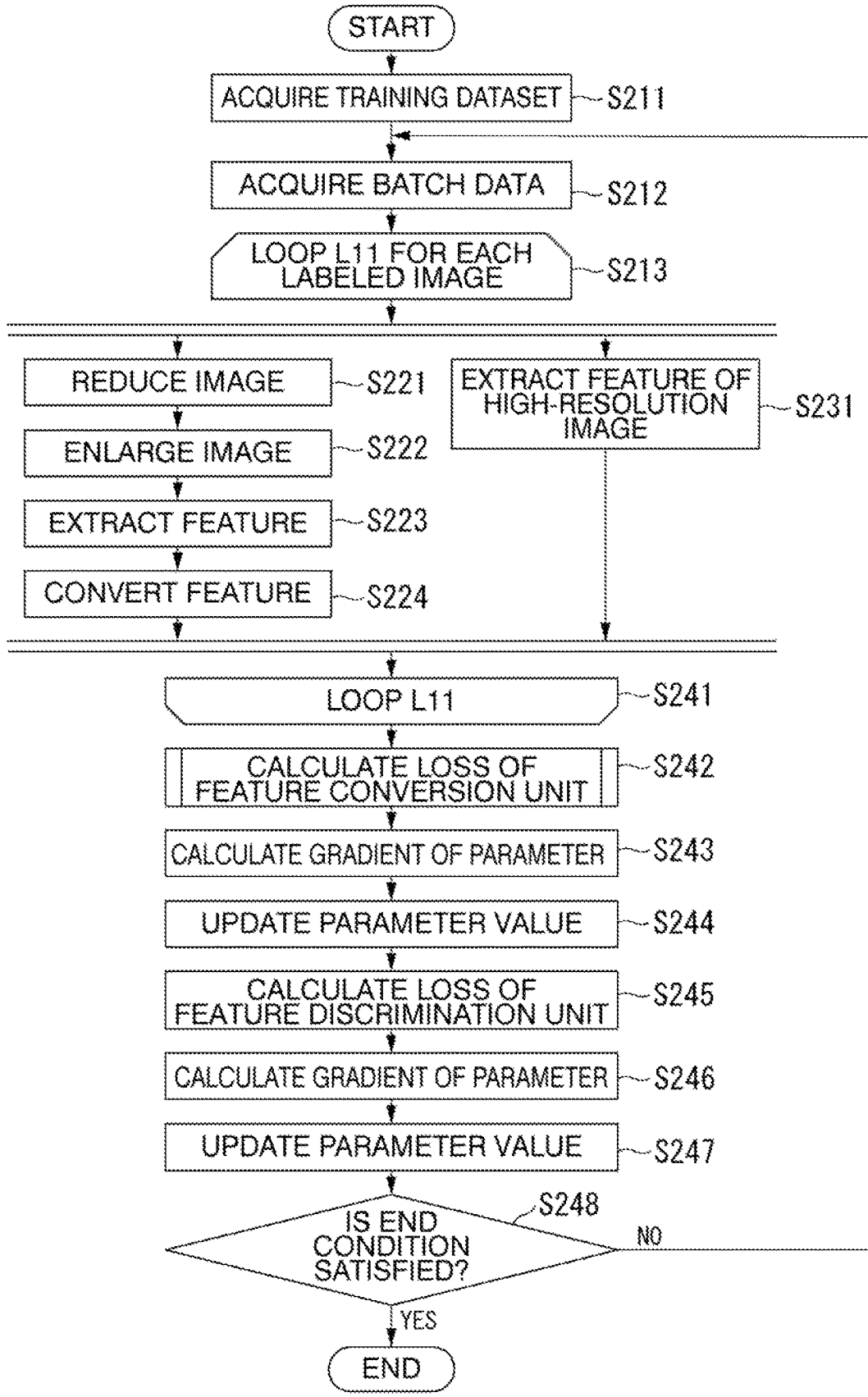
FIG. 4 is a diagram showing an example of a processing procedure in which the feature conversion learning device according to the second example embodiment performs learning process of a feature conversion unit.

FIG. 4 is a diagram showing an example of a processing procedure for performing a learning process of the feature conversion unit 105 in the feature conversion learning device 200.

In the process of FIG. 4, the image batch acquisition unit 201 acquires a training dataset including a plurality of combinations of high-resolution images that are acquired images of a human eye and class labels indicating correct classes of the high-resolution images (step S211). As described above, each combination of one high-resolution image and one class label included in the training dataset is also referred to as a labeled image.

Subsequently, the image batch acquisition unit 201 acquires batch data from the training dataset (step S212). For example, the image batch acquisition unit 201 randomly selects a predetermined number of labeled images of a batch size from the labeled images included in the training dataset. The batch data acquired by the image batch acquisition unit 201 is also referred to as image batch data.

The batch size of the image batch data acquired by the image batch acquisition unit 201 is not limited to a specific size. For example, the image batch acquisition unit 201 may be configured to acquire a training dataset including 128 labeled images, but the present disclosure is not limited thereto.

Subsequently, the feature conversion learning device 200 starts a loop L11 for performing a process for each labeled image included in the image batch data (step S213). The feature conversion learning device 200 may execute the processes of the loop L11 in parallel or may execute the processes sequentially.

In the process of the loop L11, the image reduction unit 202 reduces a high-resolution image of the labeled image (step S221). The image reduction unit 202 may be configured to randomly determine a size of the reduced image and reduce the image. The image reduction unit 202 reduces the image by thinning out the pixels of the image. Therefore, the image resolution is lowered due to the reduction of the image by the image reduction unit 202. The reduced image corresponds to a low-resolution image.

Subsequently, the image enlargement unit 103 enlarges the reduced image (step S222). An image obtained by enlarging the reduced image in the image enlargement unit 103 is also referred to as a deteriorated image. As described above, the image enlargement unit 103 enlarges the reduced image by interpolating the pixels of the reduced image so that the deteriorated image has the same resolution as the high-resolution image.

Subsequently, the feature extraction unit 104 extracts a feature of the deteriorated image (step S223).

Subsequently, the feature conversion unit 105 converts the feature of the deteriorated image (step S224). As described above, a feature after conversion by the feature conversion unit 105 is also referred to as a super-resolution feature.

Also, the feature extraction unit 104 extracts a feature of the high-resolution image of the labeled image (step S231).

Steps S221 to S224 and step S231 may be executed in parallel.

After steps S224 and S231, the feature conversion learning device 200 performs a termination process of the loop L11 (step S241). Specifically, the feature conversion learning device 200 waits for the process of the loop L11 to be completed for all labeled images included in a learning batch. When the feature conversion learning device 200 detects that the process of the loop L11 is completed for all the labeled images included in the learning batch, the feature conversion learning device 200 ends the loop L11.

After the end of the loop L11, the feature conversion learning device 200 calculates a loss for a learning process of the feature conversion unit 105 (step S242). The feature conversion learning device 200 calculates one total loss function value on the basis of a result of the process of the loop L11 for all the labeled images included in the image batch data.

Figure 5:
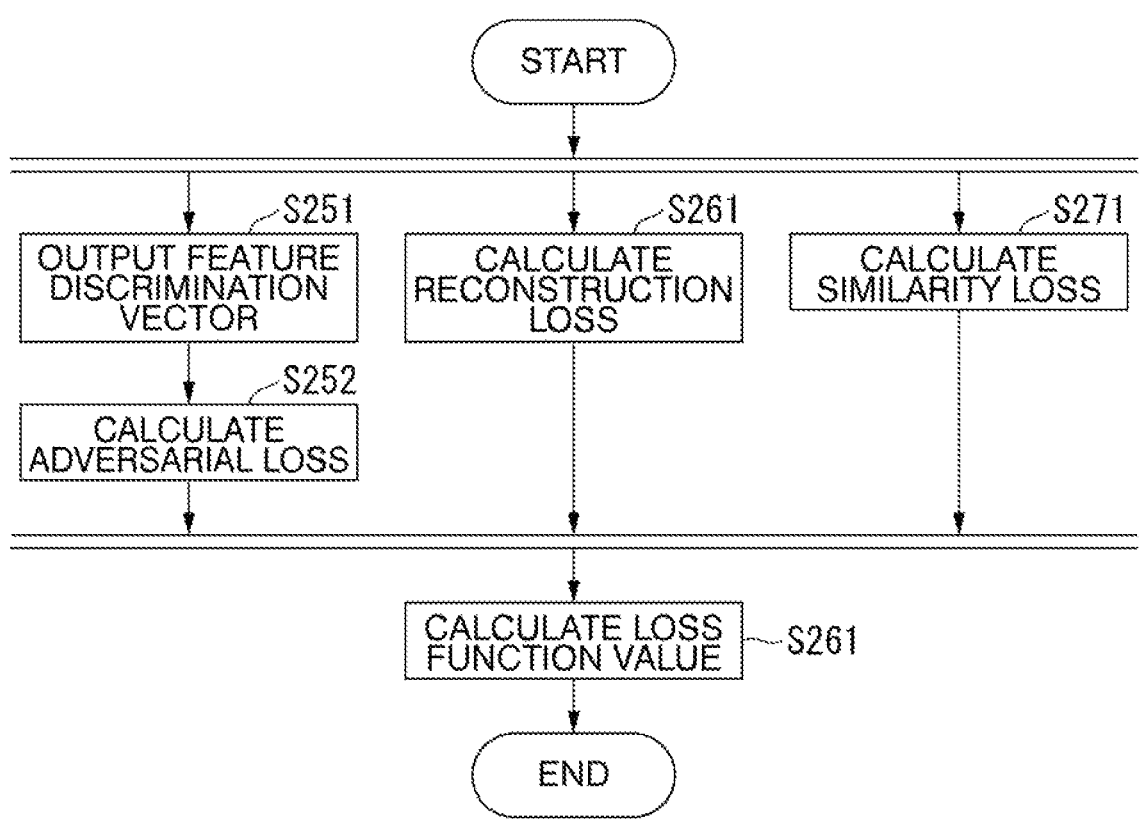
FIG. 5 is a diagram showing an example of a processing procedure in which the feature conversion learning device according to the second example embodiment calculates a loss.

FIG. 5 is a diagram showing an example of a processing procedure in which the feature conversion learning device 200 calculates a loss. The feature conversion learning device 200 performs the process of FIG. 5 in step S242 of FIG. 4.

In the process of FIG. 5, the feature discrimination unit 205 outputs a vector for determining (discriminating) whether the input feature is a super-resolution feature or a feature of a high-resolution image (step S251). For example, the feature discrimination unit 205 may be configured to calculate a probability that the input feature will be the feature of the high-resolution image and output a vector including the probability as an element. This probability has a real value from 0 to 1. For example, it is possible to discriminate a type of input image so that a feature is more likely to be a feature of a high-resolution image as the probability is closer to 1 and a feature is more likely to be a super-resolution feature when the probability is closer to 0.

Subsequently, the adversarial loss calculation unit 206 calculates the loss using the vector output by the feature discrimination unit 205 (step S252). The feature conversion unit 105 and the feature discrimination unit 205 have a structure of a generative adversarial network (GAN) and the adversarial loss calculation unit 206 calculates the adversarial loss using the vector output by the feature discrimination unit 205. The adversarial loss mentioned here is a loss whose value decreases when the discriminator makes erroneous determination.

In the learning process of the feature conversion unit 105, the adversarial loss calculation unit 206 calculates the adversarial loss using a loss function in which the adversarial loss decreases when the feature discrimination unit 205 erroneously determines the super-resolution feature as the feature of the high-resolution image. The learning control unit 208 adjusts the machine learning model parameter value of the feature conversion unit 105 so that the adversarial loss calculated by the adversarial loss calculation unit 206 decreases. Thereby, the feature conversion unit 105 generates a super-resolution feature to deceive the feature discrimination unit 205. For example, the learning process of the feature conversion unit 105 may be performed using a cross-entropy loss so that the adversarial loss calculation unit 206 outputs 1 when the super-resolution feature has been input.

On the other hand, in the learning process of the feature discrimination unit 205 which is alternately performed with the learning process of the feature conversion unit 105, the adversarial loss calculation unit 206 calculates a loss using a loss function in which the loss decreases when the feature discrimination unit 205 correctively discriminates between the super-resolution feature and the feature of the high-resolution image. The learning control unit 208 adjusts the machine learning model parameter value of the feature discrimination unit 205 so that the loss calculated by the adversarial loss calculation unit 206 decreases. Therefore, the feature discrimination unit 205 is adjusted so that the feature discrimination unit 205 can correctly discriminate between the super-resolution feature and the feature of the high-resolution image.

For example, the feature discrimination unit 205 may be configured to output a discrimination result using a real number having a range of 0 to 1. As described above, the feature discrimination unit 205 may be configured to output a probability that the input feature will be the feature of the high-resolution image. The adversarial loss calculation unit 206 may be configured to calculate the adversarial loss using binary cross entropy so that 1 is output when the feature of the high-resolution image has been input and 0 is output when the super-resolution feature has been input.

If "0" of the output of the feature discrimination unit 205 indicates a super-resolution feature and "1" indicates a high-resolution feature, the learning control unit 208 adjusts the machine learning model parameter value of the feature conversion unit 105 so that the output of the feature discrimination unit 205 is closer to 1 when an input to the feature discrimination unit 205 is the super-resolution feature. Thereby, the feature conversion unit 105 generates a super-resolution feature to deceive the feature discrimination unit 205.

On the other hand, the learning control unit 208 adjusts the machine learning model parameter value of the feature discrimination unit 205 so that the output of the feature discrimination unit 205 is closer to 0 when the input to the feature discrimination unit 205 is a super-resolution feature and the output of the feature discrimination unit 205 is closer to 1 when the input to the feature discrimination unit 205 is the feature of the high-resolution image. That is, the feature discrimination unit 205 is adjusted so that the possibility that the super-resolution feature and the feature of the high-resolution image will be correctly discriminated is high.

Also, the reconstruction loss calculation unit 204 calculates a reconstruction loss that decreases as the similarity between the super-resolution feature and the feature of the high-resolution image as a vector or a tensor increases (step S261). The learning control unit 208 adjusts the machine learning model parameter value of the feature conversion unit 105 so that the reconstruction loss decreases. Thereby, the learning control unit 208 adjusts the machine learning model parameter value of the feature conversion unit 105 so that the super-resolution feature is closer to the feature of the high-resolution image.

An index value indicating the similarity between the super-resolution feature and the feature of the high-resolution image as a vector or a tensor calculated by the reconstruction loss calculation unit 204 is not limited to a specific one. For example, the reconstruction loss calculation unit 204 may be configured to calculate the reconstruction loss so that the reconstruction loss decreases as a distance L2 associated with the feature of the super-resolution feature and the feature of the high-resolution image decreases. Alternatively, the reconstruction loss calculation unit 204 may be configured to calculate the reconstruction loss using a distance L1 instead of the distance L2.

Also, the similarity loss calculation unit 207 calculates the similarity loss using the class label. The similarity loss calculated by the similarity loss calculation unit 207 can be one of various types of loss whose values decrease when a class classification result using the super-resolution feature matches a correct answer and is not limited to a specific one.

For example, one linear layer capable of performing learning is added after an output layer of the super-resolution feature of the feature conversion unit 105 and an output of the linear layer may be one of one-hot vectors equal in number to the number of classes. The learning control unit 208 causes the linear layer to perform learning so that the linear layer performs class estimation on the basis of the super-resolution feature. Thereby, the one-hot vector output by the linear layer indicates a class of an estimation result.

The similarity loss calculation unit 207 may be configured to input each element of the one-hot vector output by the linear layer to a Softmax function and calculate a similarity loss according to cross entropy using the class label.

However, the similarity loss used by the similarity loss calculation unit 207 is not limited to a specific one. For example, the similarity loss calculation unit 207 may use an L2 Softmax loss, a cosine loss, ArcFace, CosFace, SphereFace, AdaCos, or the like as the similarity loss.

Also, the similarity loss calculation unit 207 may be configured to use a triplet loss, a center loss, a contrastive loss, or the like as the similarity loss without the addition of the one linear layer described above.

Steps S251 to S252, S261, and S271 may be executed in parallel.

After steps S252, S261, and S271, the loss function calculation unit 203 calculates a total loss function value on the basis of the adversarial loss, the reconstruction loss, and the similarity loss (step S261). The loss function calculation unit 203 calculates a loss function value using a loss function in which the loss function value decreases as an adversarial loss value decreases, the loss function value decreases as a reconstruction loss value decreases, and the loss function value decreases as a similarity loss value decreases. For example, the loss function calculation unit 203 multiplies various types of loss by coefficients and obtains a sum of multiplication results so that the total loss function is calculated. Values of these coefficients are not particularly limited.

However, the loss function calculation unit 203 may be configured to calculate a loss function value using only one or two of the adversarial loss, the reconstruction loss, and the similarity loss. Alternatively, the loss function calculation unit 203 may be configured to calculate a loss function value in another method without using any of the adversarial loss, the reconstruction loss, and the similarity loss.

After step S261, the feature conversion learning device 200 ends the process of FIG. 5.

After the process of FIG. 5 is completed, the learning control unit 208 calculates a gradient of a parameter of the neural network of the feature conversion unit 105 using an error backpropagation method (backpropagation) (step S243).

The learning control unit 208 updates a value of the parameter of the feature conversion unit 105 using the calculated gradient (step S244). The update of the parameter value in step S244 corresponds to the learning process of the feature conversion unit 105.

For example, the learning control unit 208 optimizes the parameter value so that the loss function value is minimized. Examples of an optimization method used by the learning control unit 208 can include, but are not limited to, a stochastic gradient descent (SGD) method or Adam.

Subsequently, the feature conversion learning device 200 calculates a loss for a learning process of the feature discrimination unit 205 (step S245). As described above, in the learning process of the feature discrimination unit 205, the adversarial loss calculation unit 206 calculates a loss using a loss function in which the loss decreases when the feature discrimination unit 205 correctly discriminates between the super-resolution feature and the feature of the high-resolution image.

Subsequently, the learning control unit 208 calculates the gradient of the parameter of the neural network of the feature discrimination unit 205 using the error backpropagation method (step S246).

The learning control unit 208 updates a value of the parameter of the feature discrimination unit 205 using the calculated gradient (step S244). The update of the parameter value in step S244 corresponds to the learning process of the feature discrimination unit 205.

In this way, the learning control unit 208 alternately performs parameter value optimization in the feature conversion unit 105 and the feature discrimination unit 205. When the parameter value of the feature conversion unit 105 is optimized, the learning control unit 208 fixes the parameter value of the feature discrimination unit 205. Also, when the parameter value of the feature discrimination unit 205 is optimized, the learning control unit 208 fixes the parameter value of the feature conversion unit 105.

After step S244, the learning control unit 208 determines whether or not a learning end condition is satisfied (step S248). The learning end condition here is not limited to a specific condition. For example, the learning control unit 208 may determine that the end condition is satisfied when the number of iterations of the loop from steps S212 to step S248 has reached the predetermined number of times.

Alternatively, the feature conversion learning device 200 may be configured so that the learning control unit 208 or the loss function calculation unit 203 calculates the collation accuracy according to a super-resolution feature on the basis of evaluation data obtained in the middle of the loop after the update of the parameter value in step S247. The learning control unit 208 may be configured to determine that the end condition is satisfied when the collation accuracy according to the super-resolution feature becomes higher than or equal to predetermined accuracy.

When the learning control unit 208 determines that the end condition is not satisfied in step S248 (step S248: NO), the process returns to step S212. In this case, in the feature conversion learning device 200, the learning processes of the feature conversion unit 105 and the feature discrimination unit 205 are performed continuously.

On the other hand, when the learning control unit 208 determines that the end condition is satisfied in step S248 (step S248: YES), the feature conversion learning device 200 ends the process of FIG. 4.

As described above, the image batch acquisition unit 201 acquires a high-resolution image. The image reduction unit 202 reduces the high-resolution image to a reduced image having lower resolution than the high-resolution image. The image enlargement unit 103 enlarges the reduced image to a deteriorated image having the same resolution as the high-resolution image. The feature extraction unit 104 extracts a feature of the high-resolution image and a feature of the deteriorated image. The feature conversion unit 105 converts the feature of the deteriorated image to generate a super-resolution feature. The learning control unit 208 causes the feature conversion unit 105 to learn a feature conversion method on the basis of a result of comparing the feature of the high-resolution image with the super-resolution feature. The learning of the feature conversion method mentioned here is to adjust the machine learning model parameter value for converting the feature.

In the feature conversion learning device 200, the learning process of the feature conversion unit 105 is performed, so that the feature conversion unit 105 can cause a feature of an image obtained by enlarging the reduced image to be closer to the feature of the high-resolution image. The authentication device 100 using the feature conversion unit 105 whose learning process is completed is expected to perform authentication with relatively high accuracy even if a low-resolution image is input.

Also, the feature discrimination unit 205 receives an input of the feature of the high-resolution image or the super-resolution feature and determines whether or not the input feature is the super-resolution feature. The loss function calculation unit 203 causes the feature conversion unit 105 to learn the feature conversion method on the basis of a loss function in which a loss decreases when the feature discrimination unit 205 cannot distinguish between the feature converted by the feature conversion unit 105 and other feature quantities.

According to the feature conversion learning device 200, the feature conversion unit 105 is expected to output the super-resolution feature close to the feature of the high-resolution image so that the feature discrimination unit 205 fails to discriminate between the feature of the high-resolution image and the super-resolution feature. Thereby, the authentication device 100 using the feature conversion unit 105 whose learning process is completed is expected to perform authentication with relatively high accuracy even if a low-resolution image is input.

Also, the loss function calculation unit 203 calculates an index value of a similarity between the feature of the high-resolution image and the super-resolution feature. The learning control unit 208 causes the feature conversion unit 105 to learn the feature conversion method on the basis of a loss function in which a loss decreases as a similarity between the feature of the high-resolution image and the super-resolution feature increases.

According to the feature conversion learning device 200, the feature conversion unit 105 is expected to output the super-resolution feature similar to the feature of the high-resolution image. Thereby, the authentication device 100 using the feature conversion unit 105 whose learning process is completed is expected to perform authentication with relatively high accuracy even if a low-resolution image is input.

Also, the learning control unit 208 causes the feature conversion unit 105 to learn the feature conversion method on the basis of a loss function in which a loss decreases when a class according to the class classification process on the basis of the super-resolution feature matches a correct class.

Thereby, the authentication device 100 using the feature conversion unit 105 whose learning process is completed is expected to perform authentication with relatively high accuracy even if a low-resolution image is input.

Also, the image reduction unit 202 generates a reduced image by reducing the high-resolution image to a size determined using a random number.

According to the feature conversion learning device 200, the feature conversion unit 105 is expected to be able to output a super-resolution feature close to a feature of a high-resolution image with respect to enlarged images obtained by enlarging images of various types of resolution. Thereby, the authentication device 100 using the feature conversion unit 105 whose learning process is completed is expected to perform authentication with high accuracy with respect to the input of images having various types of resolution.

Third Example Embodiment

In a third example embodiment, an example of a configuration of the feature extraction unit 104 of FIGS. 1 and 3 will be described. It is preferable that the authentication device 100 of FIG. 1 and the feature conversion learning device 200 of FIG. 3 include the feature extraction unit 104 having the same configuration, but only one of the authentication device 100 and the feature conversion learning device 200 may include a feature extraction unit according to the third example embodiment.

Figure 6:
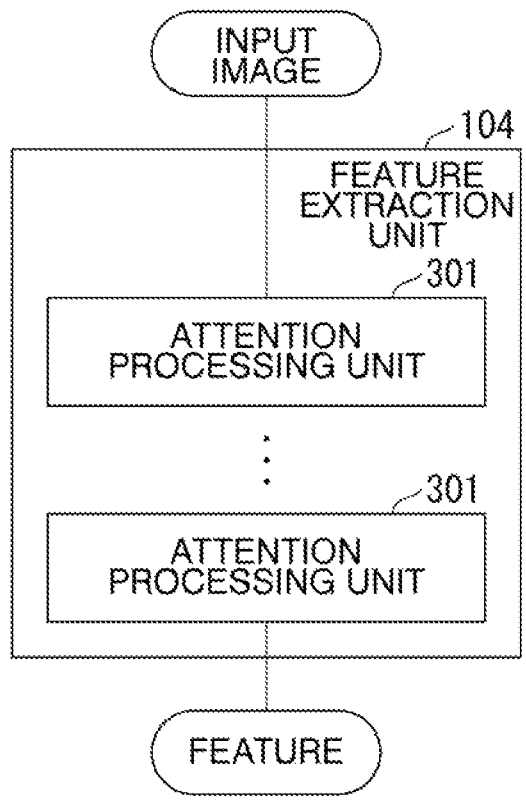
FIG. 6 is a diagram showing an example of a configuration of a feature extraction unit according to a third example embodiment.

FIG. 6 is a diagram showing an example of a configuration of the feature extraction unit 104 according to the third example embodiment. In the configuration shown in FIG. 6, the feature extraction unit 104 includes an attention processing unit 301. In the configuration shown in FIG. 6, attention processing units 301 are connected in series. The first attention processing unit 301 receives an input of image data and the last attention processing unit 301 outputs a feature. It is only necessary for the number of attention processing units 301 included in the feature extraction unit 104 to be one or more.

Attention mentioned here is to emphasize a part of an image or a feature corresponding thereto. The emphasized feature is easily reflected in the authentication result. For example, in iris authentication, it is conceivable to perform authentication on the basis of a feature of a part of an iris in particular within an image of the eye. Therefore, the attention processing unit 301 may be configured to emphasize the feature corresponding to the part of the iris among feature quantities extracted from the image of the eye by the feature extraction unit 104. The accuracy of authentication of the authentication device 100 is expected to be improved by emphasizing a feature corresponding to a feature part of the image in the attention processing unit 301 in this way. The attention processing unit 301 corresponds to an example of an attention processing means.

As described above, the feature extraction unit 104 of FIG. 6 corresponds to the example of the feature extraction unit 104 of FIGS. 1 and 3.

In the authentication device 100 or the feature conversion learning device 200, the feature extraction unit 104 extracts a feature from each of the high-resolution image and the enlarged low-resolution image. It is preferable to perform a learning process of the feature extraction unit 104 in advance using the high-resolution data.

FIG. 6 shows an example in which the feature extraction unit 104 is configured using a neural network and each of the attention processing units 301 corresponds to the layer of the neural network. Attention processing may be performed in each layer of the neural network. Alternatively, attention processing may be performed in only some layers of the neural network.

Alternatively, attention processing may be performed as pre-processing or post-processing for feature extraction.

Figure 7:
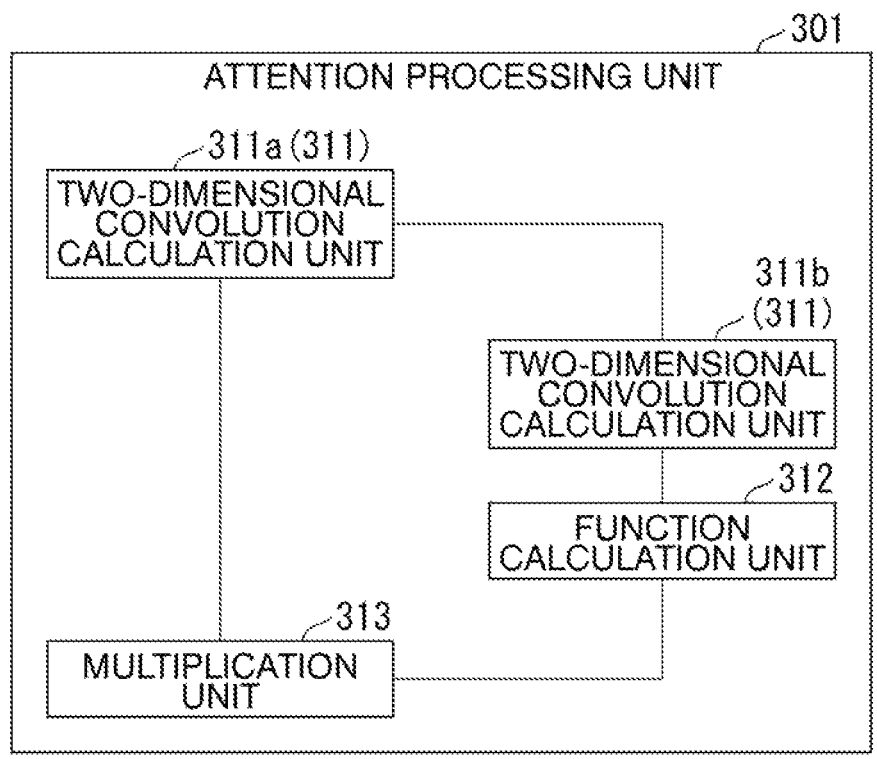
FIG. 7 is a diagram showing an example of a configuration of an attention processing unit according to the third example embodiment.

FIG. 7 is a diagram showing an example of a configuration of the attention processing unit 301. In the configuration shown in FIG. 7, the attention processing unit 301 includes two-dimensional convolution calculation units 311a and 311b, a function calculation unit 312, and a multiplication unit 313. The two-dimensional convolution calculation units 311a and 311b are collectively referred to as two-dimensional convolution calculation units 311.

The two-dimensional convolution calculation unit 311 performs convolution calculation on data in the form of a two-dimensional matrix. The two-dimensional convolution calculation unit 311a performs convolution calculation for feature extraction. The two-dimensional convolution calculation unit 311b performs convolution calculation as filtering for attention to the feature extracted by the two-dimensional convolution calculation unit 311a.

The function calculation unit 312 applies a predetermined function to an output of the two-dimensional convolution calculation unit 311b. For example, the function calculation unit 312 replaces a value of each element of the data in the form of a two-dimensional matrix showing a calculation result of the two-dimensional convolution calculation unit 311b with a value to which a Softmax function is applied. Thereby, the function calculation unit 312 calculates a weighting coefficient for emphasizing a part detected by the two-dimensional convolution calculation unit 311b from output data of the two-dimensional convolution calculation unit 311a. The application of the function by the function calculation unit 312 also corresponds to the calculation of an activation function of the neural network.

The multiplication unit 313 multiplies an output of the two-dimensional convolution calculation unit 311a by an output of the function calculation unit 312 for each element of data in the form of a two-dimensional matrix. Thereby, the multiplication unit 313 weights the feature extracted by the two-dimensional convolution calculation unit 311a according to a weighting coefficient calculated by the function calculation unit 312.

The attention processing unit 301 may be configured to learn a method of detecting a target area of attention. Specifically, the attention processing unit 301 may be configured to learn the filter of the two-dimensional convolution calculation unit 311b so that the loss calculated by the learning control unit 208 decreases.

Figure 8:
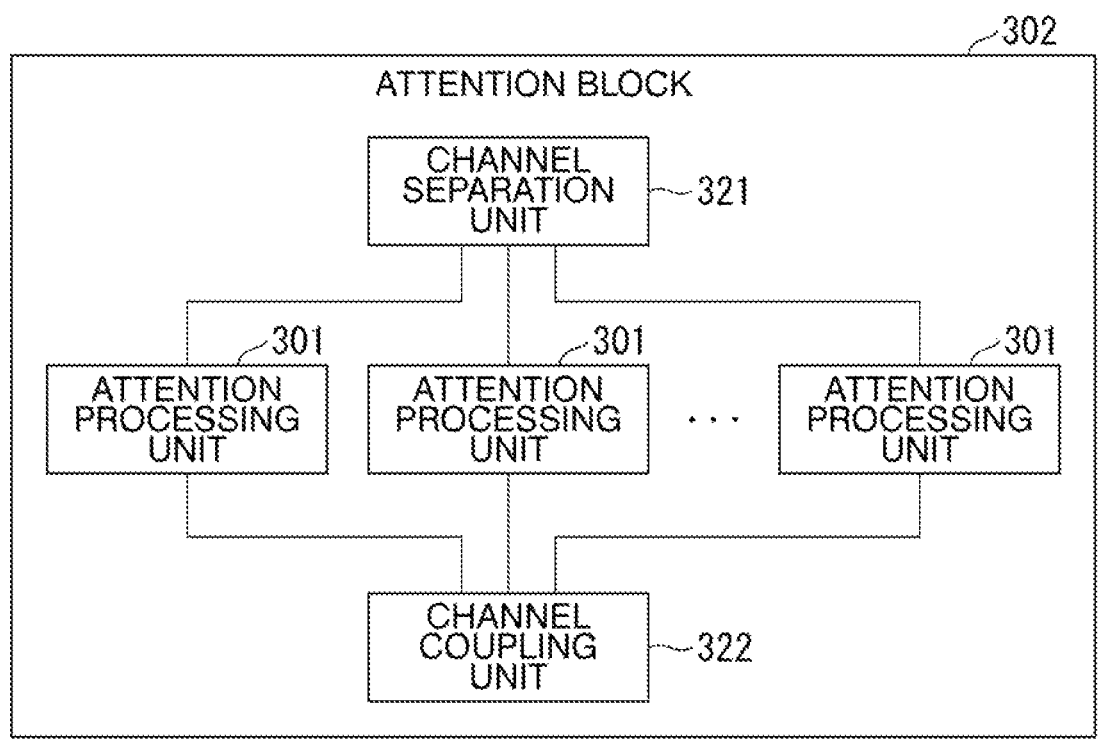
FIG. 8 is a diagram showing an example of a configuration of an attention block 302 according to a first variant example of the attention processing unit according to the third example embodiment.

FIG. 8 is a diagram showing an example of a configuration of the attention block 302 according to the first variant example of the attention processing unit 301. The feature extraction unit 104 shown in FIG. 6 may be configured to include an attention block 302 instead of the attention processing unit 301. In the configuration shown in FIG. 8, the attention block 302 includes a channel separation unit 321, an attention processing unit 301, and a channel coupling unit 322.

In the configuration shown in FIG. 8, a plurality of attention processing units 301 are arranged in parallel. Each of the attention processing units 301 receives data input from the channel separation unit 321 and outputs the data to the channel coupling unit 322. However, it is only necessary for the number of attention processing units 301 included in the attention block 302 to be one or more.

The channel separation unit 321 acquires the input data for the attention block 302 as the input data for the channel separation unit 321 and outputs the input data or a part of the data to each of the attention processing units 301. A process performed by the channel separation unit 321 corresponds to a process of separating the channel of the neural network into a plurality of blocks.

A method in which the channel separation unit 321 generates data for each attention processing unit 301 from the input data is not limited to a specific method. For example, the channel separation unit 321 may be configured to output the input data to each of the attention processing units 301 as it is. Alternatively, the channel separation unit 321 may be configured to separate the input data on the basis of a position in the image in the separation of the input data into data corresponding to the left, center, and right of the original image or the like and output the each separated data to the attention processing unit 301. Also, the channel separation unit 321 may be configured to separate the input data on the basis of a position in the channel in the separation of the input data from an original number of channels into a plurality of channels or the like and output the each separated data to the attention processing unit 301.

Each of the attention processing units 301 extracts feature quantities from the input data for the attention processing unit 301 itself and emphasizes some of the extracted feature quantities to output the emphasized feature quantities. As the attention processing unit 301 of the attention block 302, the attention processing unit 301 of FIG. 7 can be used.

The channel coupling unit 322 integrates the data output by each of the attention processing units 301 into single data. Methods in which the channel coupling unit 322 integrates the data can include various methods corresponding to the method in which the channel separation unit 321 generates the data for each attention processing unit 301 from the single data.

For example, when the channel separation unit 321 outputs the input data to each of the attention processing units 301 as it is, the channel coupling unit 322 may be configured to perform integration into single data by averaging or summing data in the form of a two-dimensional matrix output from each of the attention processing units 301 for each element.

Also, when the channel separation unit 321 separates the input data on the basis of the position in the image, the channel coupling unit 322 may be configured to perform integration into single data by arranging and coupling the data from each of the attention processing units 301 in accordance with the position in the image.

Here, in the image used for iris authentication, there are many features for personal identification, especially in an iris part and a part around the eye. In this way, it is conceivable that a feature for personal identification is present in each of a plurality of parts of an authentication target image. Therefore, in the attention block 302, a channel of the neural network is separated into a plurality of blocks, attention processing is performed for each block, and the outputs of the blocks are coupled. Thereby, in the attention block 302, the feature extraction can be performed by paying attention to each part such as the iris, the eyelid, and the eyebrow where there are many features for personal identification.

The attention block 302 may be configured to emphasize some channels with respect to channels associated with a feature vector instead of an image area.

Figure 9:
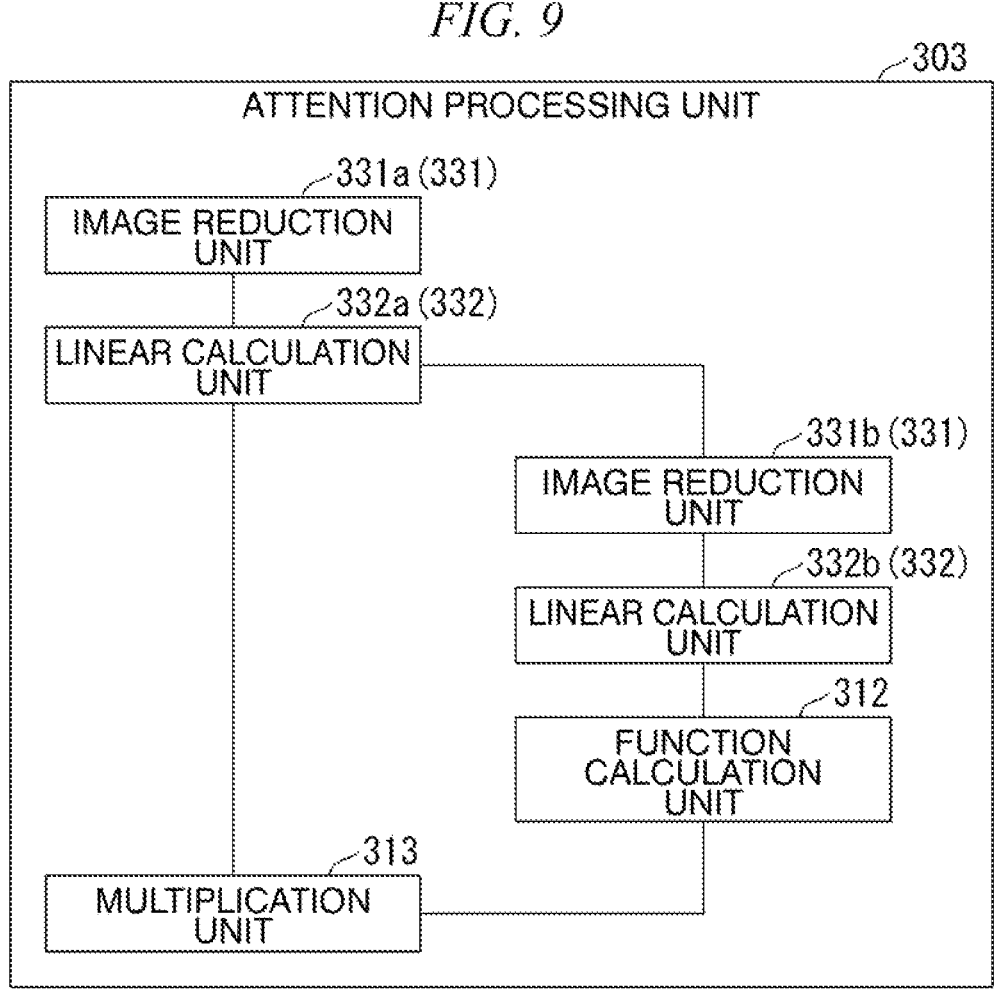
FIG. 9 is a diagram showing an example of a configuration of an attention processing unit 303 according to a second variant example of the attention processing unit according to the third example embodiment.

FIG. 9 is a diagram showing an example of a configuration of the attention processing unit 303 according to the second variant example of the attention processing unit 301. The attention block 302 shown in FIG. 8 may be configured to include an attention processing unit 303 instead of the attention processing unit 301.

In the configuration shown in FIG. 9, the attention processing unit 303 includes an image reduction unit 331, a linear calculation unit 332, a function calculation unit 312, and a multiplication unit 313.

When the attention processing unit 303 is compared with the attention processing unit 301, the two-dimensional convolution calculation unit 311b of the attention processing unit 301 is replaced with the image reduction unit 331 and the linear calculation unit 332 in the attention processing unit 303. That is, in the attention processing unit 303, the two-dimensional convolution calculation unit 311 is configured to be separated into the image reduction unit 331 and the linear calculation unit 332. In other respects, the attention processing unit 303 is similar to the attention processing unit 301.

When the two image reduction units 331 are distinguished, the image reduction unit 331 corresponding to the two-dimensional convolution calculation unit 311a is referred to as an image reduction unit 331a and the image reduction unit 331 corresponding to the two-dimensional convolution calculation unit 311b is referred to as an image reduction unit 331b. When the two linear calculation units 332 are distinguished, the linear calculation unit 332 corresponding to the two-dimensional convolution calculation unit 311a is referred to as a linear calculation unit 332a and the linear calculation unit 332 corresponding to the two-dimensional convolution calculation unit 311b is referred to as a linear calculation unit 332b.

The image reduction unit 331 reduces an input image to a size of 1×1. That is, the image reduction unit 331 reduces a tensor having a size of channel C, height H, and width W to a tensor having a size of channel C, height 1, and width 1. A method in which the image reduction unit 331 reduces the image is not limited to a specific method. For example, the image reduction unit 331 may reduce the image using an averaging method, but the present disclosure is not limited thereto.

The linear calculation unit 332 performs linear calculation with respect to the channel. Each of an input tensor and an output tensor of the linear calculation unit 332 has a size of (C, 1, 1).

The function calculation unit 312 applies the Softmax function to the output of the linear calculation unit 332b, so that a weight for emphasizing the channel is calculated.

Figure 10:
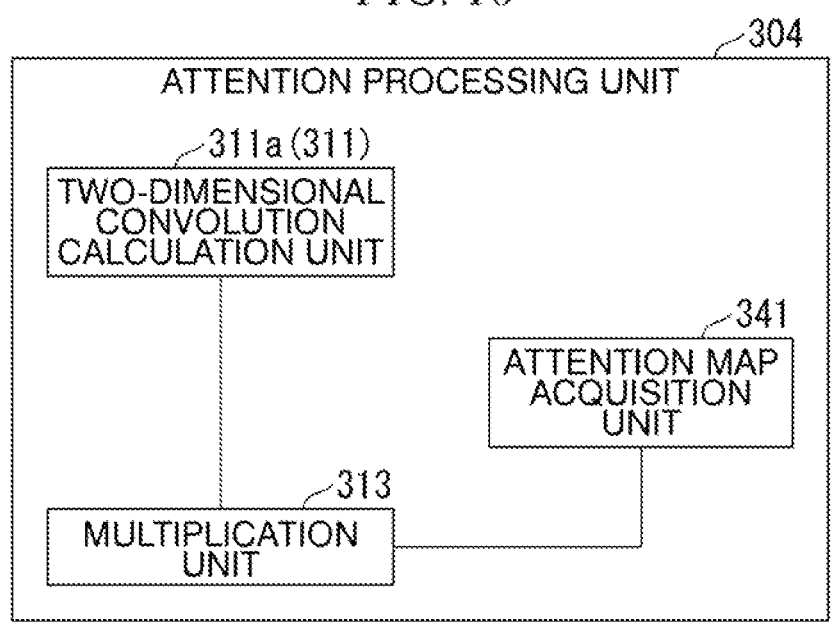
FIG. 10 is a diagram showing an example of a configuration of an attention processing unit 304 according to the second variant example of the attention processing unit according to the third example embodiment.

FIG. 10 is a diagram showing an example of a configuration of the attention processing unit 304 according to the third variant example of the attention processing unit 301. The feature extraction unit 104 shown in FIG. 6 may be configured to include an attention processing unit 304 instead of the attention processing unit 301.

In the configuration shown in FIG. 10, the attention processing unit 304 includes a two-dimensional convolution calculation unit 311a, a multiplication unit 313, and an attention map acquisition unit 341. The two-dimensional convolution calculation unit 311a is also referred to as a two-dimensional convolution calculation unit 311.

A process performed by the two-dimensional convolution calculation unit 311a is similar to that of the two-dimensional convolution calculation unit 311a of the attention processing unit 301. A process performed by the multiplication unit 313 is similar to that of the multiplication unit 313 of the attention processing unit 301.

The attention map acquisition unit 341 acquires an attention map. The attention map is data indicating a part to be emphasized by the attention processing unit 304 among the input data for the attention processing unit 304. When the attention processing unit 304 uses the attention map, the attention map is, so to speak, correct data for the attention and is included in training data.

In the attention processing unit 304, the multiplication unit 313 performs weighting according to the attention map with respect to the output from the two-dimensional convolution calculation unit 311a. Also, the attention processing unit 304 may learn the method of emphasizing according to the attention in the feature in the two-dimensional convolution calculation unit 311a in addition to the method of extracting the feature. For example, the attention processing unit 304 may be configured to multiply the attention map input from training data by a temperature coefficient S and input a multiplication result to the Softmax function and the multiplication unit 313 may be configured to multiply a result of the convolution calculation unit 311 by an obtained function value. In this case, the temperature coefficient S may be a parameter adjusted through learning.

As described above, the attention processing unit 301 performs weighting for emphasizing a feature corresponding to a specific part among an image or a channel of a feature extraction target.

Thereby, the authentication device 100 is expected to perform authentication with relatively high accuracy using a feature in which a part having many features for personal identification is emphasized.

Fourth Example Embodiment

Figure 11:
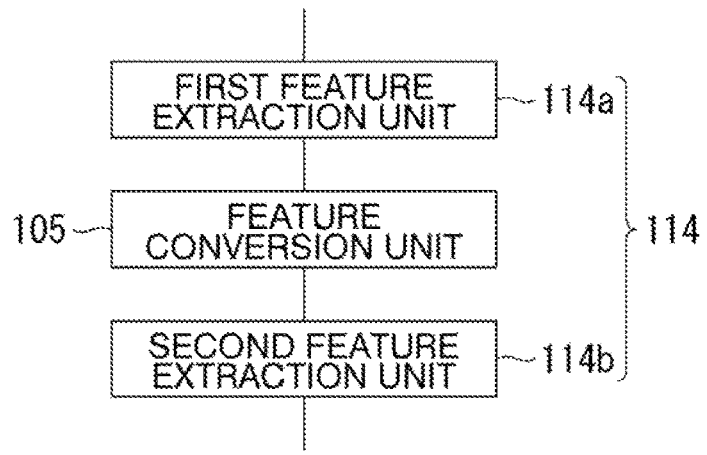
FIG. 11 is a diagram showing an example of a configuration of a feature extraction unit according to a variant example of a feature extraction unit in a fourth example embodiment.

FIG. 11 is a diagram showing an example of a configuration of a feature extraction unit 114 according to a variant example of the feature extraction unit 104. Both or one of the authentication device 100 of FIG. 1 and the feature conversion learning device 200 of FIG. 3 may be configured to include the feature extraction unit 114 instead of the feature extraction unit 104.

In the configuration shown in FIG. 11, the feature extraction unit 114 includes a first feature extraction unit 114a and a second feature extraction unit 114b. An output of the first feature extraction unit 114a is input to the feature conversion unit 105 and an output of the feature conversion unit 105 is input to the second feature extraction unit 114b.

The first feature extraction unit 114a and the second feature extraction unit 114b include two partial networks into which the neural network constituting the feature extraction unit 104 is divided between layers.

Figure 12:
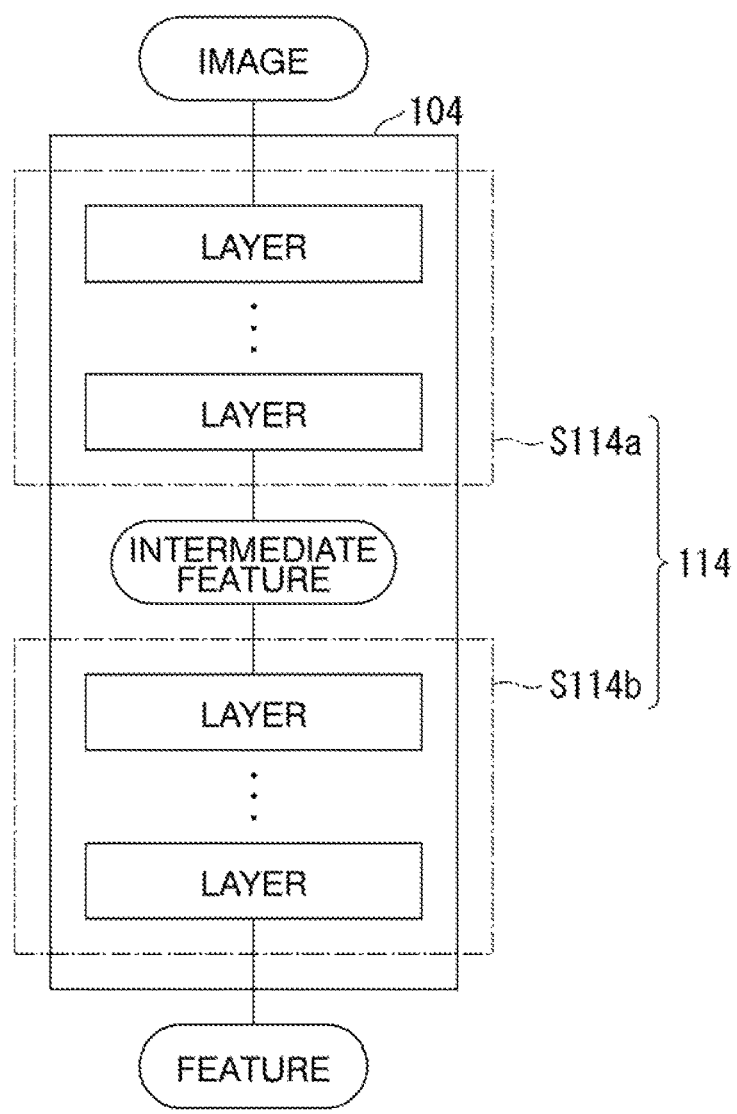
FIG. 12 is a diagram showing an example of a hierarchical structure of a neural network constituting the feature extraction unit according to the fourth example embodiment.

FIG. 12 is a diagram showing an example of a hierarchical structure of the neural network constituting the feature extraction unit 104.

In the example of FIG. 12, the feature extraction unit 104 is configured using a neural network having a plurality of layers. The layers of the neural networks constituting the feature extraction unit 104 are grouped into a group of one or more layers from the front side and a group of one or more layers from the back side. The front side mentioned here is the side of the input layer. The back side is the side of the output layer.

The first feature extraction unit 114a is configured using the neural network corresponding to the group of one or more layers from the front side between these two groups. The second feature extraction unit 114*b* is configured using the neural network corresponding to the group of one or more layers from the back side between these two groups.

The output of the first feature extraction unit 114*a* corresponds to an intermediate feature in the feature extraction unit 104. The output of the first feature extraction unit 114*a* when a low-resolution image is input as image data to the first feature extraction unit 114*a* is also referred to as a low-resolution intermediate feature.

In the configuration of FIG. 11, the feature conversion unit 105 receives an input of the low-resolution intermediate feature and converts the input low-resolution intermediate feature. The output of the feature conversion unit 105 in this case is also referred to as a super-resolution intermediate feature.

The second feature extraction unit 114*b* receives an input of the super-resolution intermediate feature and further extracts the feature. The output of the second feature extraction unit 114*b* corresponds to the super-resolution feature output by the feature conversion unit 105 in the configuration of FIG. 1 and the configuration of FIG. 3.

In this way, the feature conversion unit 105 may perform feature super-resolution using the feature output by the neural network constituting the feature extraction unit 104. In addition, the feature conversion unit 105 may perform feature super-resolution using the feature in an intermediate layer. For example, a VGG network 16 includes 13 convolutional layers and 3 fully coupled layers. The feature conversion unit 105 may perform feature super-resolution on an intermediate feature output by a second layer from the front side of the convolutional layer among these layers and a super-resolution intermediate feature output by the feature conversion unit 105 may be input to a third layer from the front side of the convolutional layer. Alternatively, the feature conversion unit 105 may perform feature super-resolution on an intermediate feature output by a fourth layer from the front side of the convolutional layer, and a super-resolution intermediate feature output by the feature conversion unit 105 may be input to a fifth layer from the front side of the convolutional layer.

As described above, the feature conversion unit 105 converts the feature with respect to the intermediate feature generated by the feature extraction unit.

Thereby, the authentication device 100 can obtain an effect between image super-resolution for converting an input image for the feature extractor into super-resolution and feature super-resolution for converting an output feature into super-resolution. That is, a super-resolution part is not limited to an input or an output to the feature conversion unit 105 and therefore the feature super-resolution can be performed in an intermediate feature that can maximize authentication performance at magnification according to target magnification. As a result, the feature super-resolution can be performed with higher accuracy.

Fifth Example Embodiment

Figure 13:
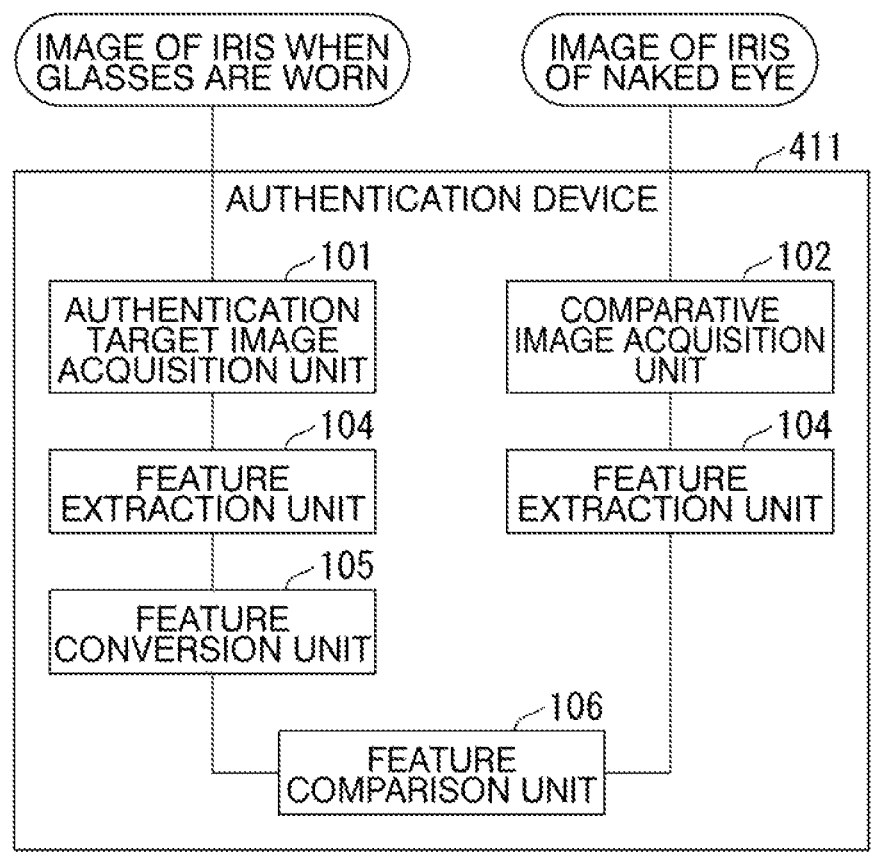
FIG. 13 is a diagram showing an example of a configuration of an authentication device according to a fifth example embodiment.

FIG. 13 is a diagram showing an example of a configuration of an authentication device according to a fifth example embodiment. In the configuration shown in FIG. 13, the authentication device 411 includes an authentication target image acquisition unit 101, a comparative image acquisition unit 102, a feature extraction unit 104, a feature conversion unit 105, and a feature comparison unit 106.

Parts having similar functions in correspondence with the parts of FIG. 1 among parts of FIG. 13 are denoted by the same reference numerals (101, 102, 104, 105, and 106), and a detailed description thereof will be omitted here.

An image for use in authentication is different between the authentication device 100 of FIG. 1 and the authentication device 411 of FIG. 13. The authentication device 100 acquires a low-resolution image as an authentication target image and acquires a high-resolution image as a comparative image. On the other hand, the authentication device 411 acquires an image of an iris when glasses are worn as the authentication target image and acquires an image of the iris of a naked eye having the same resolution as the authentication target image as the comparative image. Also, it is only necessary for resolution levels of the authentication image and the comparative image to be approximately the same and resolution levels of the authentication image and the comparative image do not have to be exactly the same.

Also, the authentication device 411 does not include the image enlargement unit 103 provided in the authentication device 100. In the authentication device 411, the authentication target image acquisition unit 101 outputs the authentication target image that has been acquired to the feature extraction unit 104.

In other respects, the authentication device 411 is similar to the authentication device 100.

In the authentication device 411 of the fifth example embodiment, the feature extraction unit 104 extracts the feature of the authentication target image in a method that is the same as the feature extraction method for the comparative image which is an image of the iris of the naked eye. The feature extraction unit 104 may extract the feature of the comparative image at the time of authentication. Alternatively, the authentication device 100 may be configured to store the feature of the comparative image in advance.

In the authentication device 411 of the fifth example embodiment, the feature conversion unit 105 receives an input of the feature of the image of the iris when glasses are worn and converts the feature so that a difference from the feature of the iris image of the naked eye becomes small. A machine learning parameter value of the feature conversion unit 105 is adjusted according to learning using a loss function whose value decreases as a difference between the feature after conversion from the feature of the image of the iris when the glasses are worn and the feature of the image of the iris of the naked eye decreases. In this case, the image of the iris when the glasses are worn corresponds to an example of a first learning image and the image of the iris of the naked eye corresponds to an example of a second learning image. A feature conversion learning device 412 according to a sixth example embodiment performs this learning.

As described above, the authentication target image acquisition unit 101 acquires the image of the iris when the glasses are worn as the authentication target image. The feature extraction unit 104 extracts the feature of the authentication target image in the method that is the same as the feature extraction method for the comparative image which is the image of the iris of the naked eye. The feature conversion unit 105 converts the feature of the authentication target image on the basis of a result of learning a feature conversion method using a loss function whose value decreases as a difference between a feature after conversion from a feature of the first learning image that is the image of the iris when the glasses are worn and a feature of the second learning image that is the image of the iris of the naked eye decreases. The feature comparison unit 106 compares a feature after conversion by the feature conversion unit 105 with a feature of the comparative image.

According to the authentication device 411 according to the fifth example embodiment, the feature of the image of the iris when the glasses are worn is expected to be closer to the feature of the image of the iris of the naked eye. According to the authentication device 411 according to the fifth example embodiment, in this respect, the iris authentication is expected to be performed with relatively high accuracy even if an authentication target person is wearing glasses.

Sixth Example Embodiment

Figure 14:
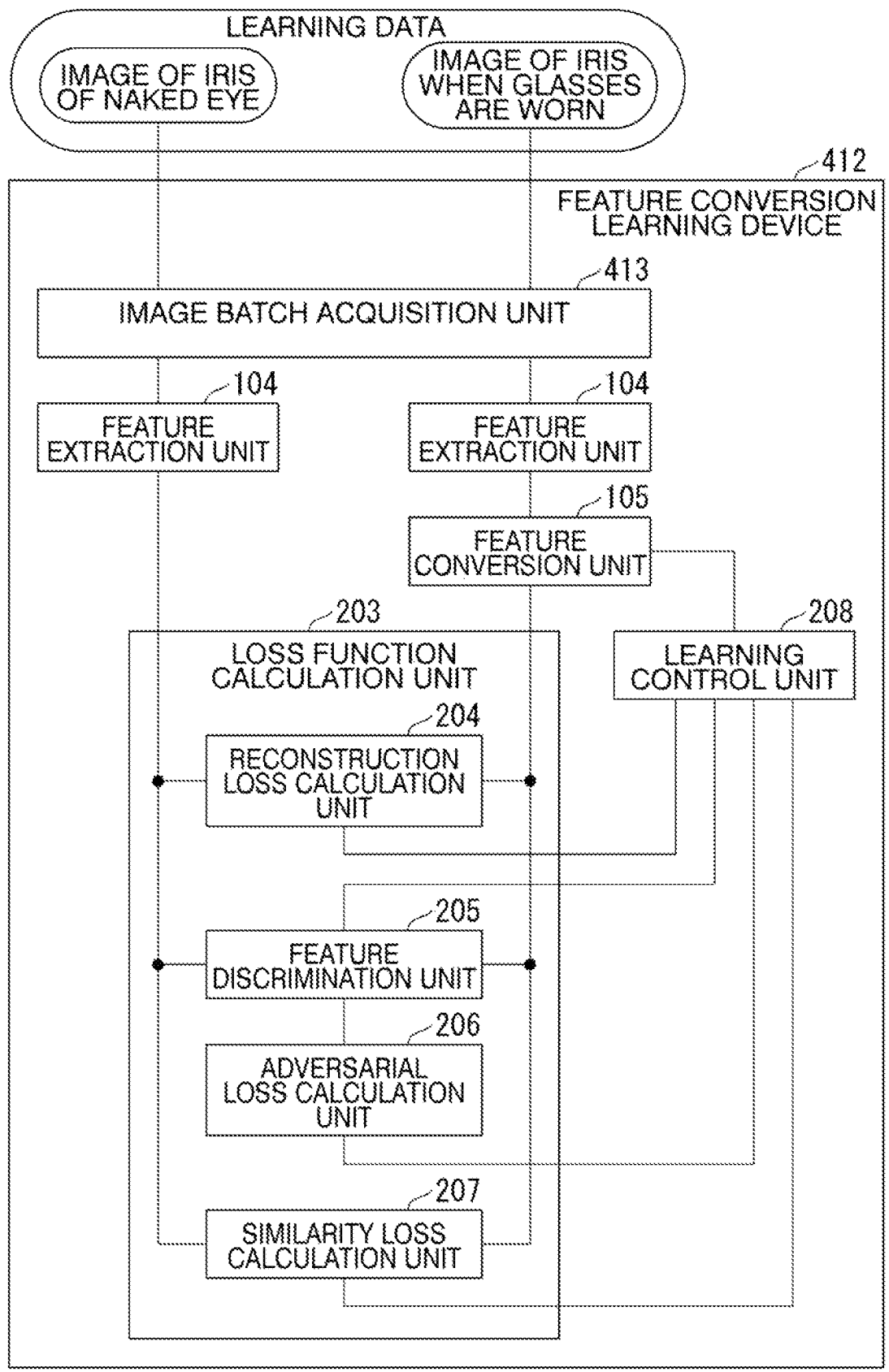
FIG. 14 is a diagram showing an example of a configuration of a feature conversion learning device according to a sixth example embodiment.

FIG. 14 is a diagram showing an example of a configuration of a feature conversion learning device according to a sixth example embodiment. A feature conversion learning device 412 of the sixth example embodiment performs a learning process of the feature conversion unit 105 of the authentication device 411 of the fifth example embodiment.

In the configuration shown in FIG. 14, the feature conversion learning device 412 includes an image batch acquisition unit 413, a feature extraction unit 104, a feature conversion unit 105, a loss function calculation unit 203, and a learning control unit 208. The loss function calculation unit 203 includes a reconstruction loss calculation unit 204, a feature discrimination unit 205, an adversarial loss calculation unit 206, and a similarity loss calculation unit 207.

Parts having similar functions in correspondence with the parts of FIG. 3 among parts of FIG. 14 are denoted by the same reference numerals (104, 105, and 203 to 208), and a detailed description thereof will be omitted here.

An image included in training data is different between the feature conversion learning device 200 of FIG. 3 and the feature conversion learning device 412 of FIG. 14.

The image batch acquisition unit 201 of the feature conversion learning device 200 acquires training data including a plurality of combinations of high-resolution images and class labels indicating correct classes in a process of classifying classes of the images.

On the other hand, the image batch acquisition unit 413 of the feature conversion learning device 412 acquires training data including a plurality of combinations of images of the iris when glasses are worn and images of the iris of the naked eye and class labels indicating correct classes in a process of classifying classes of these images. Images of the same person and the same resolution are used as the image of the iris when the glasses are worn and the image of the iris of the naked eye.

The image batch acquisition unit 413 corresponds to an example of an image acquisition unit. The image of the iris of the naked eye included in the training data corresponds to an example of a first image and the image of the iris when the glasses are worn corresponds to an example of a second image.

Also, the feature conversion learning device 412 does not include the image reduction unit 202 and the image enlargement unit 103 provided in the feature conversion learning device 200.

The image batch acquisition unit 201 outputs each of an image of the iris when the glasses are worn and an image of the iris of the naked eye to the feature extraction unit 104. The feature extraction unit 104 extracts a feature of the image of the iris when the glasses are worn and a feature of the image of the iris of the naked eye.

The feature of the image of the iris of the naked eye corresponds to an example of a first feature. The feature of the image of the iris when the glasses are worn corresponds to an example of a second feature.

The feature conversion unit 105 receives an input of the feature of the image of the iris when the glasses are worn and converts the feature so that a difference from the feature of the image of the iris of the naked eye becomes small. A feature after conversion from the feature of the image of the iris when the glasses are worn corresponds to an example of a third feature.

The loss function calculation unit 203 calculates a loss on the basis of the feature after conversion by the feature conversion unit 105 and the feature of the image of the iris of the naked eye.

The learning control unit 208 updates a machine learning model parameter values of each of the feature conversion unit 105 and the feature discrimination unit 205 on the basis of the loss calculated by the loss function calculation unit 203. The learning control unit 208 updates the above-described machine learning model parameter value so that the difference between the feature after conversion by the feature conversion unit 105 and the feature of the image of the iris of the naked eye decreases.

As described above, the image batch acquisition unit 413 acquires the first image that is the image of the iris of the naked eye and the second image that is the image of the iris when glasses are worn. The feature extraction unit 104 extracts the first feature that is the feature of the first image and the second feature that is the feature of the second image. The feature conversion unit 105 converts the second feature into the third feature. The learning control unit 208 causes the feature conversion unit 105 to learn a feature conversion method on the basis of a result of comparing the first feature with the third feature.

According to the feature conversion learning device 412 according to the sixth example embodiment, it is possible to cause the feature conversion unit 105 to perform learning so that a conversion process in which the feature of the iris image when the glasses are worn is closer to the feature of the iris image of the naked eye is performed. By performing authentication using the feature conversion unit 105, the authentication device 411 is expected to be able to perform iris authentication with relatively high accuracy even if the authentication target person is wearing the glasses.

Seventh Example Embodiment

Figure 15:
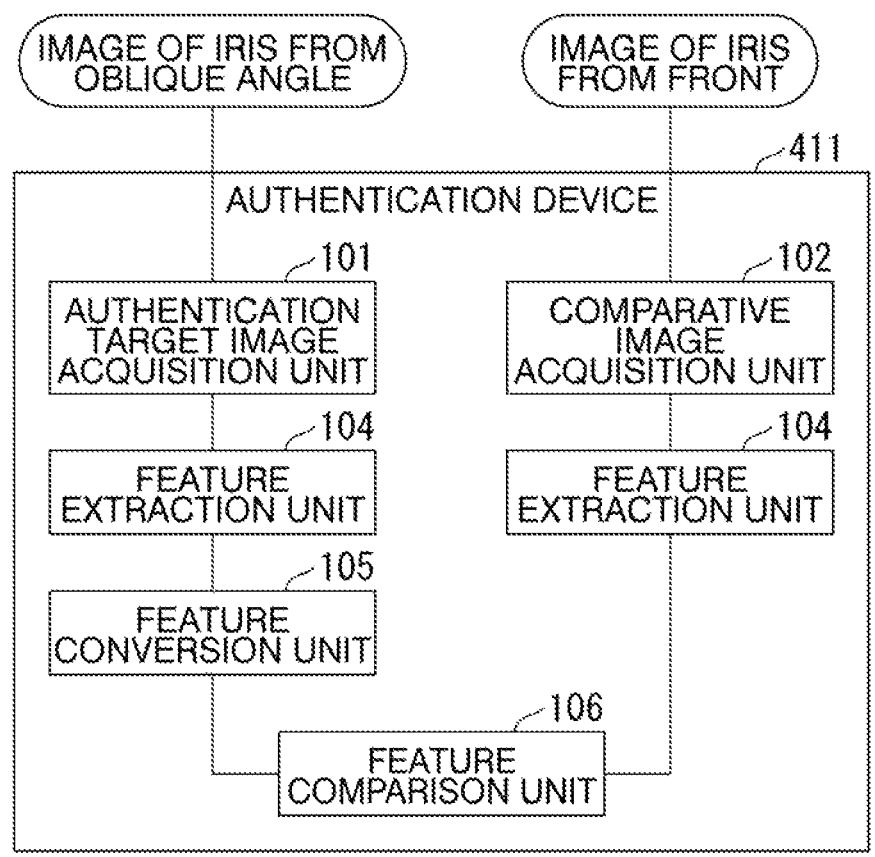
FIG. 15 is a diagram showing an example of a configuration of an authentication device according to a seventh example embodiment.

FIG. 15 is a diagram showing an example of a configuration of an authentication device according to a seventh example embodiment. In the configuration shown in FIG. 15, the authentication device 411 includes an authentication target image acquisition unit 101, a comparative image acquisition unit 102, a feature extraction unit 104, a feature conversion unit 105, and a feature comparison unit 106.

A configuration of the authentication device 411 according to the seventh example embodiment is similar to the configuration of the authentication device 411 according to the fifth example embodiment. Parts having similar functions in correspondence with the parts of FIG. 13 among parts of FIG. 15 are denoted by the same reference numerals (101, 102, 104, 105, 106, and 411), and a detailed description thereof will be omitted here.

In the seventh example embodiment, an image for use in authentication by the authentication device 411 is different from that in the fifth example embodiment. The authentication device 411 of the fifth example embodiment acquires an image of an iris when glasses are worn as an authentication target image and an image of the iris of a naked eye having the same resolution as the authentication target image as a comparative image. On the other hand, the authentication device 411 of the seventh example embodiment acquires an image of the iris acquired from an oblique angle as the authentication target image and an image of the iris acquired from the front with the same resolution as the authentication target image as a comparative image.

In the authentication device 411 of the seventh example embodiment, the feature extraction unit 104 extracts a feature of the authentication target image in a method that is the same as the feature extraction method for the comparative image that is the image of the iris acquired from the front. The feature extraction unit 104 may be configured to extract the feature of the comparative image at the time of authentication. Alternatively, the authentication device 100 may be configured to store the feature of the comparative image in advance.

In the authentication device 411 of the seventh example embodiment, the feature conversion unit 105 receives an input of the feature of the image of the iris acquired from the oblique angle and converts the feature so that a difference from the feature of the image of the iris acquired from the front becomes small. A machine learning parameter value of the feature conversion unit 105 is adjusted according to learning using a loss function whose value decreases as a difference between the feature after conversion from the feature of the image of the iris acquired from the oblique angle and the feature of the image of the iris acquired from the front decreases. In this case, the image of the iris acquired from the oblique angle corresponds to an example of a first learning image and the image of the iris acquired from the front corresponds to an example of a second learning image. A feature conversion learning device 412 according to an eighth example embodiment performs this learning.

As described above, the authentication target image acquisition unit 101 acquires the image of the iris acquired from the oblique angle as the authentication target image. The feature extraction unit 104 extracts the feature of the authentication target image in the method that is the same as the feature extraction method for the comparative image that is the image of the iris acquired from the front. The feature conversion unit 105 converts the feature of the authentication target image on the basis of a result of learning a feature conversion method using a loss function whose value decreases as a difference between a feature after conversion from a feature of the first learning image that is the image of the iris acquired from the oblique angle and a feature of the second learning image that is the image of the iris acquired from the front decreases. The feature comparison unit 106 compares a feature after conversion by the feature conversion unit 105 with a feature of the comparative image.

According to the authentication device 411 according to the seventh example embodiment, the feature of the image of the iris acquired from the oblique angle is expected to be closer to the feature of the image of the iris acquired from the front. According to the authentication device 411 according to the seventh example embodiment, in this respect, iris authentication is expected to be performed with relatively high accuracy even if an image obtained by acquiring the image of the iris of the authentication target person from the oblique angle is used as the authentication target image.

Eighth Example Embodiment

Figure 16:
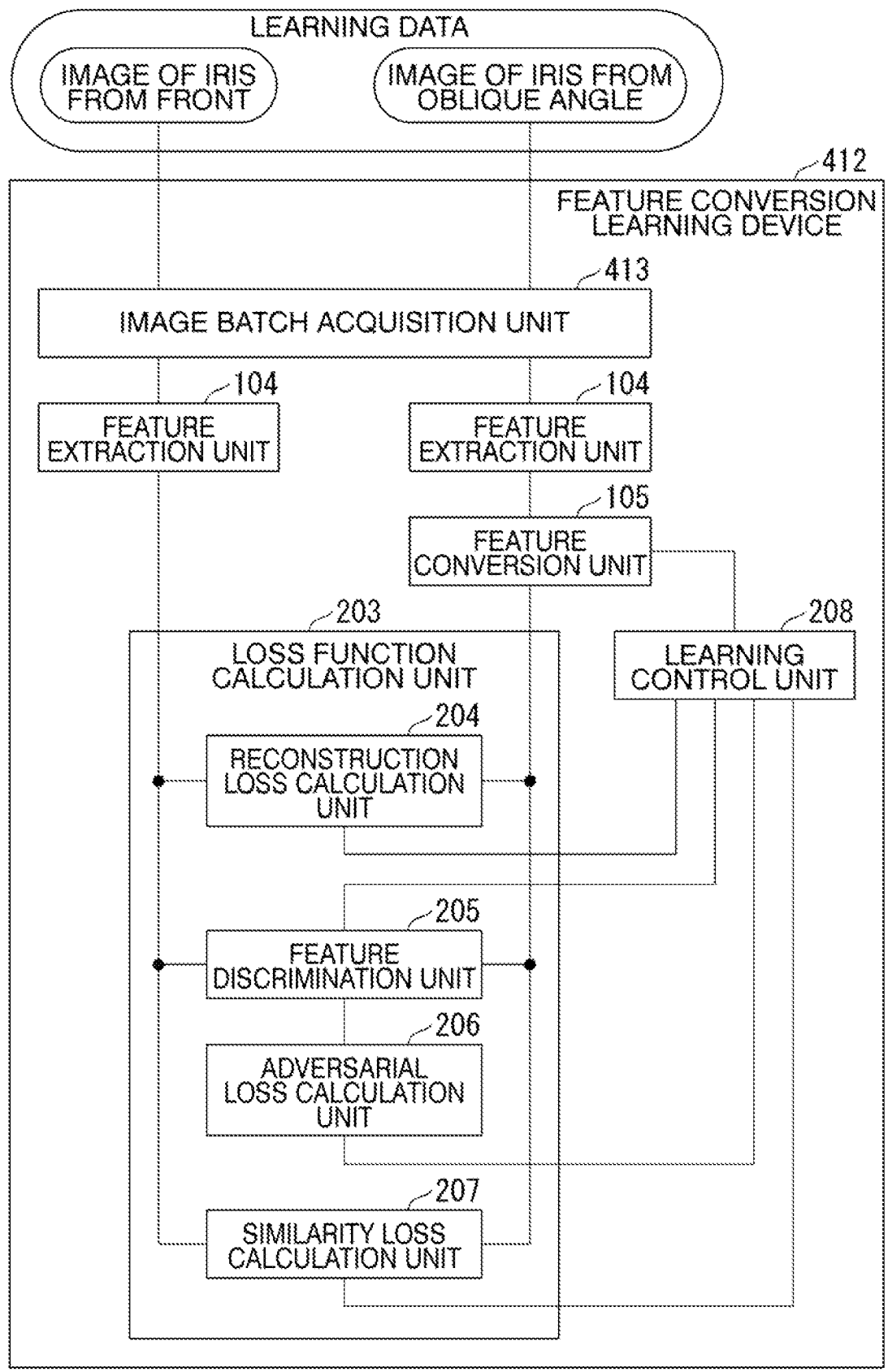
FIG. 16 is a diagram showing an example of a configuration of a feature conversion learning device according to an eighth example embodiment.

FIG. 16 is a diagram showing an example of a configuration of a feature conversion learning device according to an eighth example embodiment. A feature conversion learning device 412 of the eighth example embodiment performs a learning process of the feature conversion unit 105 of the authentication device 411 of the seventh example embodiment.

In the configuration shown in FIG. 16, the feature conversion learning device 412 includes an image batch acquisition unit 413, a feature extraction unit 104, a feature conversion unit 105, a loss function calculation unit 203, and a learning control unit 208. The loss function calculation unit 203 includes a reconstruction loss calculation unit 204, a feature discrimination unit 205, an adversarial loss calculation unit 206, and a similarity loss calculation unit 207.

A configuration of the feature conversion learning device 412 according to the eighth example embodiment is similar to the configuration of the feature conversion learning device 412 according to the sixth example embodiment. Parts having similar functions in correspondence with the parts of FIG. 14 among parts of FIG. 16 are designated by the same reference numerals (104, 105, 203 to 208, 312, 412, and 413), and a detailed description thereof will be omitted here.

In the eighth example embodiment, an image included in training data acquired by the feature conversion learning device 412 is different from that in the sixth example embodiment.

In the sixth example embodiment, the image batch acquisition unit 413 of the feature conversion learning device 412 acquires training data including a plurality of combinations of images of both an iris when glasses are worn and the iris of a naked eye, and class labels indicating correct classes in a process of classifying classes of these images.

On the other hand, in the eighth example embodiment, the image batch acquisition unit 413 of the feature conversion learning device 412 acquires training data including a plurality of combinations of images of the iris acquired from the front, images of the iris acquired from an oblique angle, and class labels indicating correct classes in a process of classifying classes of these images. Images of the same person and the same resolution are used as the image of the iris acquired from the front and the image of the iris acquired from the oblique angle.

The image batch acquisition unit 413 corresponds to an example of an image acquisition unit. The image of the iris acquired from the front included in the training data corresponds to an example of a first image and the image of the iris acquired from the oblique angle corresponds to an example of a second image.

In the eighth example embodiment, the image batch acquisition unit 201 outputs each of the image of the iris acquired from the oblique angle and the image of the iris acquired from the front to the feature extraction unit 104. The feature extraction unit 104 extracts a feature of the image of the iris acquired from the oblique angle and a feature of the image of the iris acquired from the front.

The feature of the image of the iris acquired from the front corresponds to an example of a first feature. The feature of the image of the iris acquired from the oblique angle corresponds to an example of a second feature.

The feature conversion unit 105 receives an input of the feature of the image of the iris acquired from the oblique angle and converts the feature so that a difference from the feature of the image of the iris acquired from the front becomes small. A feature after conversion from the feature of the image of the iris acquired from the oblique angle corresponds to an example of a third feature. The loss function calculation unit 203 calculates loss on the basis of the feature after conversion by the feature conversion unit 105 and the feature of the image of the iris acquired from the front.

The learning control unit 208 updates a machine learning model parameter values of each of the feature conversion unit 105 and the feature discrimination unit 205 on the basis of the loss calculated by the loss function calculation unit 203. The learning control unit 208 updates the above-described machine learning model parameter value so that a difference between the feature after conversion by the feature conversion unit 105 and the feature of the image of the iris acquired from the front becomes small.

As described above, the image batch acquisition unit 413 acquires the first image that is the image of the iris acquired from the front and the second image that is the image of the iris acquired from the oblique angle. The feature extraction unit 104 extracts the first feature that is the feature of the first image and the second feature that is the feature of the second image. The feature conversion unit 105 converts the second feature into the third feature. The learning control unit 208 causes the feature conversion unit 105 to learn a feature conversion method on the basis of a result of comparing the first feature with the third feature.

The feature conversion learning device 412 according to the eighth example embodiment can cause the feature conversion unit 105 to perform learning so that a conversion process in which the feature of the image of the iris acquired from the oblique angle is closer to the feature of the image of the iris acquired from the front is performed. The authentication device 411 is expected to be able to perform iris authentication with relatively high accuracy even if the image of the iris acquired from the oblique angle is used as an authentication target image by performing authentication using the feature conversion unit 105.

Ninth Example Embodiment

Figure 17:
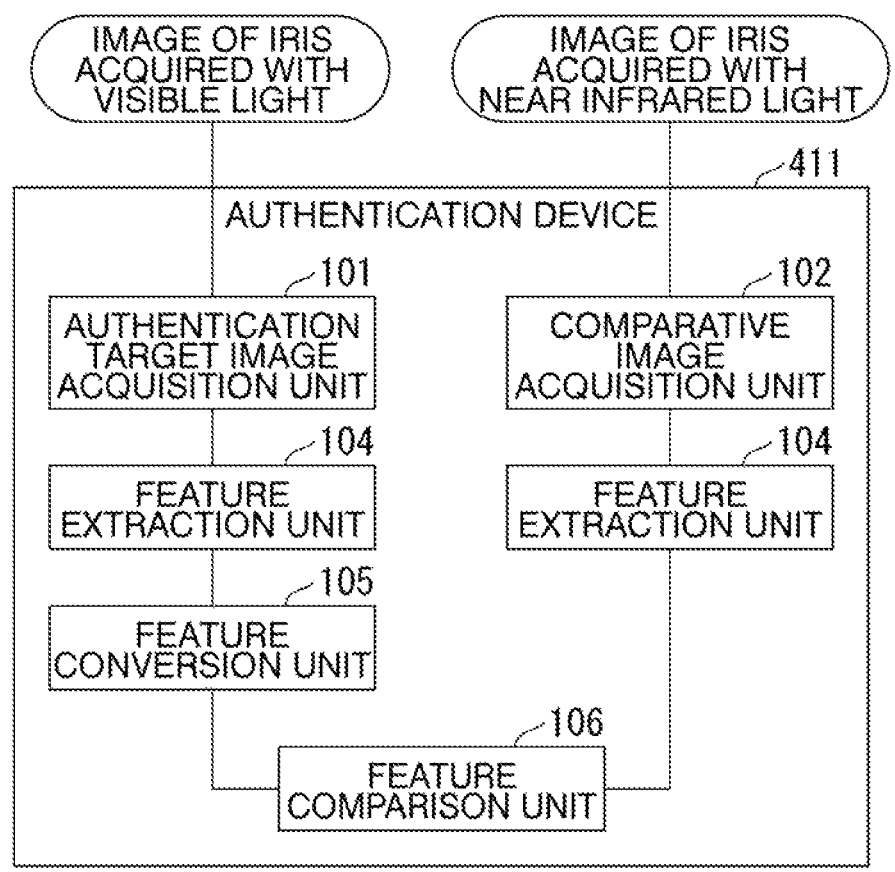
FIG. 17 is a diagram showing an example of a configuration of an authentication device according to a ninth example embodiment.

FIG. 17 is a diagram showing an example of a configuration of an authentication device according to a ninth example embodiment. In the configuration shown in FIG. 17, an authentication device 411 includes an authentication target image acquisition unit 101, a comparative image acquisition unit 102, a feature extraction unit 104, a feature conversion unit 105, and a feature comparison unit 106.

The configuration of the authentication device 411 according to the ninth example embodiment is similar to the configuration of the authentication device 411 according to the fifth example embodiment. Parts having similar functions in correspondence with the parts of FIG. 13 among parts of FIG. 17 are designated by the same reference numerals (101, 102, 104, 105, 106, and 411), and a detailed description thereof will be omitted here.

In the ninth example embodiment, an image for use in authentication by the authentication device 411 is different from that in the fifth example embodiment. The authentication device 411 of the fifth example embodiment acquires an image of an iris when glasses are worn as an authentication target image and an image of the iris of the naked eye having the same resolution as the authentication target image as a comparative image. On the other hand, the authentication device 411 of the ninth example embodiment acquires an image of the iris acquired with visible light as the authentication target image and acquires an image having the same resolution as the authentication target image and an image of the iris acquired with light such as near infrared light other than the visible light as a comparative image. A wavelength for the image for authentication is not limited to that of the visible light and the image for authentication may be an image captured at another wavelength of ultraviolet light, near infrared light, or the like. Also, the number of channels representing the color of the input image is not particularly limited.

In the authentication device 411 of the ninth example embodiment, the feature extraction unit 104 extracts a feature of the authentication target image in a method that is the same as a feature extraction method for the comparative image that is the image of the iris acquired with light other than the visible light. The feature extraction unit 104 may be configured to extract a feature of the comparative image at the time of authentication. Alternatively, the authentication device 100 may be configured to store the feature of the comparative image in advance.

In the authentication device 411 of the ninth example embodiment, the feature conversion unit 105 receives an input of a feature of the image of the iris acquired with the visible light and converts the feature so that a difference from a feature of the image of the iris acquired with light other than the visible light becomes small. A machine learning parameter value of the feature conversion unit 105 is adjusted according to learning using a loss function whose value decreases as a difference between a feature after conversion from the feature of the image of the iris acquired with the visible light and a feature of the image of the iris acquired with light other than the visible light decreases. In this case, the image of the iris acquired with the visible light corresponds to an example of a first learning image and the image of the iris acquired with light other than the visible light corresponds to an example of a second learning image. A feature conversion learning device 412 according to a tenth example embodiment performs this learning.

As described above, the authentication target image acquisition unit 101 acquires the image of the iris acquired with the visible light as the authentication target image. The feature extraction unit 104 extracts the feature of the authentication target image in the method that is the same as the feature extraction method for the comparative image which is the image of the iris acquired with light other than the visible light. The feature conversion unit 105 converts the feature of the authentication target image on the basis of a result of learning a feature conversion method using a loss function whose value decreases as a difference between a feature after conversion from a feature of the first learning image that is the image of the iris acquired with the visible light and a feature of the second learning image that is the image of the iris acquired with light other than the visible light decreases. The feature comparison unit 106 compares a feature after conversion by the feature conversion unit 105 with a feature of the comparative image.

According to the authentication device 411 according to the ninth example embodiment, the feature of the image of the iris acquired with the visible light is expected to be closer to the feature of the image of the iris acquired with light other than the visible light. In this respect, the authentication device 411 according to the seventh example embodiment is expected to perform iris authentication with relatively high accuracy using an image captured with the visible light even if the comparative image is captured with light other than the visible light.

Tenth Example Embodiment

Figure 18:
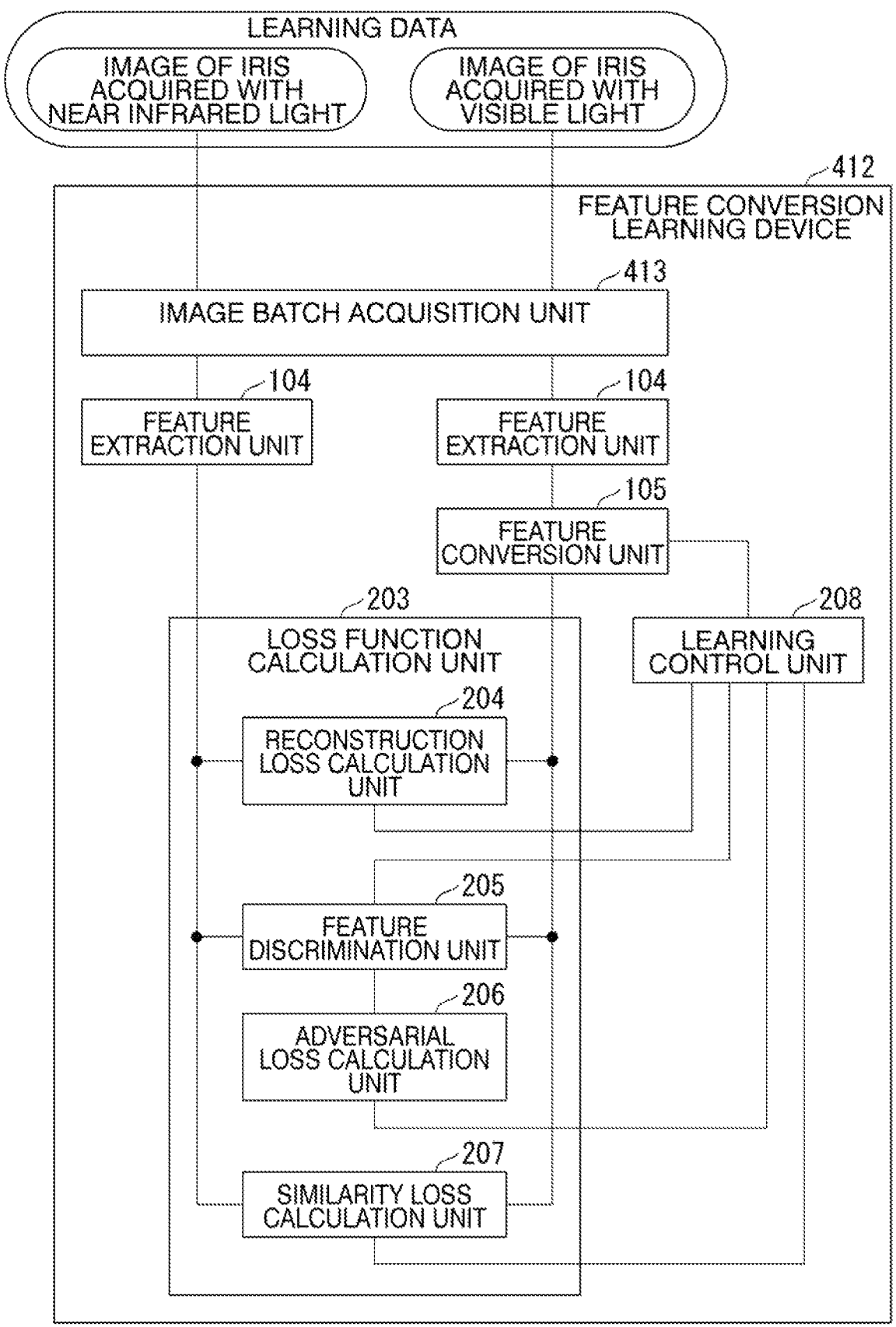
FIG. 18 is a diagram showing an example of a configuration of a feature conversion learning device according to a tenth example embodiment.

FIG. 18 is a diagram showing an example of a configuration of a feature conversion learning device according to a tenth example embodiment. A feature conversion learning device 412 of the tenth example embodiment performs a learning process of the feature conversion unit 105 of the authentication device 411 of the ninth example embodiment.

Even in the tenth example embodiment, a wavelength of an image for authentication is not limited to visible light and may be an image captured at another wavelength of ultraviolet light, near infrared light, or the like. Also, the number of channels representing the color of an input image is not particularly limited.

In the configuration shown in FIG. 18, the feature conversion learning device 412 includes an image batch acquisition unit 413, a feature extraction unit 104, a feature conversion unit 105, a loss function calculation unit 203, and a learning control unit 208. The loss function calculation unit 203 includes a reconstruction loss calculation unit 204, a feature discrimination unit 205, an adversarial loss calculation unit 206, and a similarity loss calculation unit 207.

A configuration of the feature conversion learning device 412 according to the tenth example embodiment is similar to the configuration of the feature conversion learning device 412 according to the sixth example embodiment. Parts having similar functions in correspondence with the parts of FIG. 14 among parts of FIG. 18 are denoted by the same reference numerals (104, 105, 203 to 208, 312, 412, and 413), and a detailed description thereof will be omitted here.

In the tenth example embodiment, an image included in training data acquired by the feature conversion learning device 412 is different from that in the sixth example embodiment.

In the sixth example embodiment, the image batch acquisition unit 413 of the feature conversion learning device 412 acquires training data including a plurality of combinations of images of both an iris when glasses are worn and the iris of a naked eye, and class labels indicating correct classes in a process of classifying classes of these images.

On the other hand, in the tenth example embodiment, the image batch acquisition unit 413 of the feature conversion learning device 412 acquires training data including a plurality of combinations of images of the iris acquired with light other than the visible light, images of the iris acquired with the visible light, and class labels indicating correct classes in a process of classifying classes of these images. Images of the same person and the same resolution are used as the image of the iris acquired with light other than the visible light and the image of the iris acquired with the visible light.

The image batch acquisition unit 413 corresponds to an example of an image acquisition unit. The image of the iris acquired with light other than the visible light included in the training data corresponds to an example of a first image and the image of the iris acquired with the visible light corresponds to an example of a second image.

In the tenth example embodiment, the image batch acquisition unit 201 outputs each of the image of the iris acquired with the visible light and the image of the iris acquired with light other than the visible light to the feature extraction unit 104. The feature extraction unit 104 extracts a feature of the image of the iris acquired with the visible light and a feature of the image of the iris acquired with light other than the visible light.

The feature of the image of the iris acquired with light other than the visible light corresponds to an example of a first feature. The feature of the image of the iris acquired with the visible light corresponds to an example of a second feature.

The feature conversion unit 105 receives an input of the feature of the image of the iris acquired with the visible light and converts the feature so that a difference from the feature of the image of the iris acquired with light other than visible light becomes small. A feature after conversion from the feature of the image of the iris acquired with the visible light corresponds to an example of a third feature. The loss function calculation unit 203 calculates a loss on the basis of the feature after conversion by the feature conversion unit 105 and the feature of the image of the iris acquired with light other than the visible light.

The learning control unit 208 updates a machine learning model parameter values of each of the feature conversion unit 105 and the feature discrimination unit 205 on the basis of the loss calculated by the loss function calculation unit 203. The learning control unit 208 updates the above-described machine learning model parameter value so that the difference between the feature after conversion by the feature conversion unit 105 and the feature of the image of the iris acquired with light other than the visible light becomes small.

As described above, the image batch acquisition unit 413 acquires the first image that is the image of the iris acquired with light other than the visible light and the second image that is the image of the iris acquired with the visible light. The feature extraction unit 104 extracts the first feature that is the feature of the first image and the second feature that is the feature of the second image. The feature conversion unit 105 converts the second feature into the third feature. The learning control unit 208 causes the feature conversion unit 105 to learn a feature conversion method on the basis of a result of comparing the first feature with the third feature.

The feature conversion learning device 412 according to the tenth example embodiment can cause the feature conversion unit 105 to perform learning so that a conversion process in which the feature of the image of the iris acquired with the visible light is closer to the feature of the image of the iris acquired with light other than the visible light is performed. The authentication device 411 is expected to perform iris authentication with relatively high accuracy using an image captured with the visible light even if the comparative image is captured with light other than the visible light by performing authentication using the feature conversion unit 105.

Eleventh Example Embodiment

Figure 19:
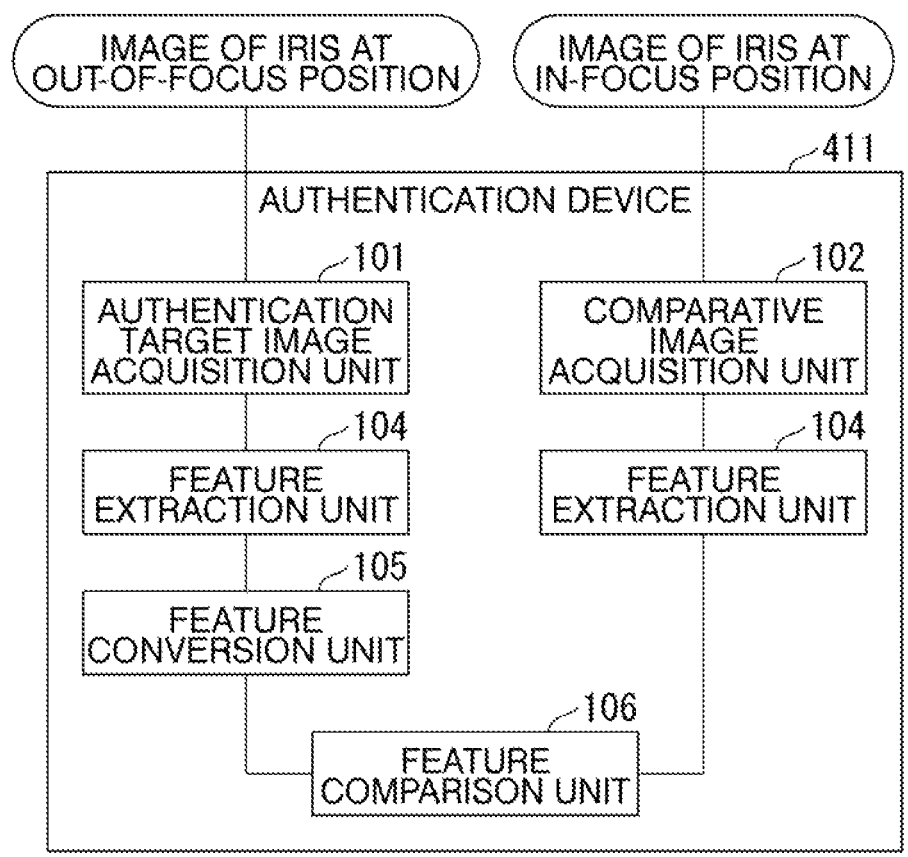
FIG. 19 is a diagram showing an example of a configuration of an authentication device according to an eleventh example embodiment.

FIG. 19 is a diagram showing an example of a configuration of an authentication device according to an eleventh example embodiment. In the configuration shown in FIG. 19, an authentication device 411 includes an authentication target image acquisition unit 101, a comparative image acquisition unit 102, a feature extraction unit 104, a feature conversion unit 105, and a feature comparison unit 106.

A configuration of the authentication device 411 according to the eleventh example embodiment is similar to the configuration of the authentication device 411 according to the fifth example embodiment. Parts having similar functions in correspondence with the parts of FIG. 13 among parts of FIG. 19 are denoted by the same reference numerals (101, 102, 104, 105, 106, and 411), and a detailed description thereof will be omitted here.

In the eleventh example embodiment, an image for use in authentication by the authentication device 411 is different from that in the fifth example embodiment. The authentication device 411 of the fifth example embodiment acquires an image of an iris when glasses are worn as an authentication target image and an image of an iris of a naked eye having the same resolution as the authentication target image as a comparative image. On the other hand, the authentication device 411 of the eleventh example embodiment acquires an image of the iris whose image is out of focus as the authentication target image and an image of the iris whose image is in focus having the same resolution as the authentication target image as a comparative image.

The term "in focus" is also called an in-focus position. The term "out of focus" is also called an out-of-focus position.

In the authentication device 411 of the eleventh example embodiment, the feature extraction unit 104 extracts a feature of the authentication target image in a method that is the same as a feature extraction method for the comparative image that is an image of the iris whose image is in focus. The feature extraction unit 104 may be configured to extract a feature of the comparative image at the time of authentication. Alternatively, the authentication device 100 may be configured to store the feature of the comparative image in advance.

In the authentication device 411 of the ninth example embodiment, the feature conversion unit 105 receives an input of the feature of the image of the iris whose image is out of focus and converts the feature so that a difference from the feature of the image of the iris whose image is in focus becomes small. A machine learning parameter value of the feature conversion unit 105 is adjusted according to learning using a loss function whose value decreases as a difference between a feature after conversion from the feature of the image of the iris whose image is out of focus and a feature of the image of the iris whose image is in focus decreases. In this case, the image of the iris whose image is out of focus corresponds to an example of a first learning image and the image of the iris whose image is in focus corresponds to an example of a second learning image. A feature conversion learning device 412 according to a twelfth example embodiment performs this learning.

As described above, the authentication target image acquisition unit 101 acquires the image of the iris whose image is out of focus as the authentication target image. The feature extraction unit 104 extracts the feature of the authentication target image in the method that is the same as the feature extraction method for the comparative image that is the image of the iris whose image is in focus. The feature conversion unit 105 converts the feature of the authentication target image on the basis of a result of learning a feature conversion method using a loss function whose value decreases as a difference between a feature after conversion from a feature of the first learning image that is the image of the iris whose image is out of focus and a feature of the second learning image that is the image of the iris whose image is in focus decreases. The feature comparison unit 106 compares a feature after conversion by the feature conversion unit 105 with a feature of the comparative image.

According to the authentication device 411 according to the eleventh example embodiment, the feature of the image of the iris whose image is out of focus is expected to be closer to the feature of the image of the iris whose image is in focus. In this respect, the authentication device 411 according to the eleventh example embodiment is expected to perform iris authentication with relatively high accuracy even if the image of the iris whose image is out of focus is used as the authentication target image.

Twelfth Example Embodiment

Figure 20:
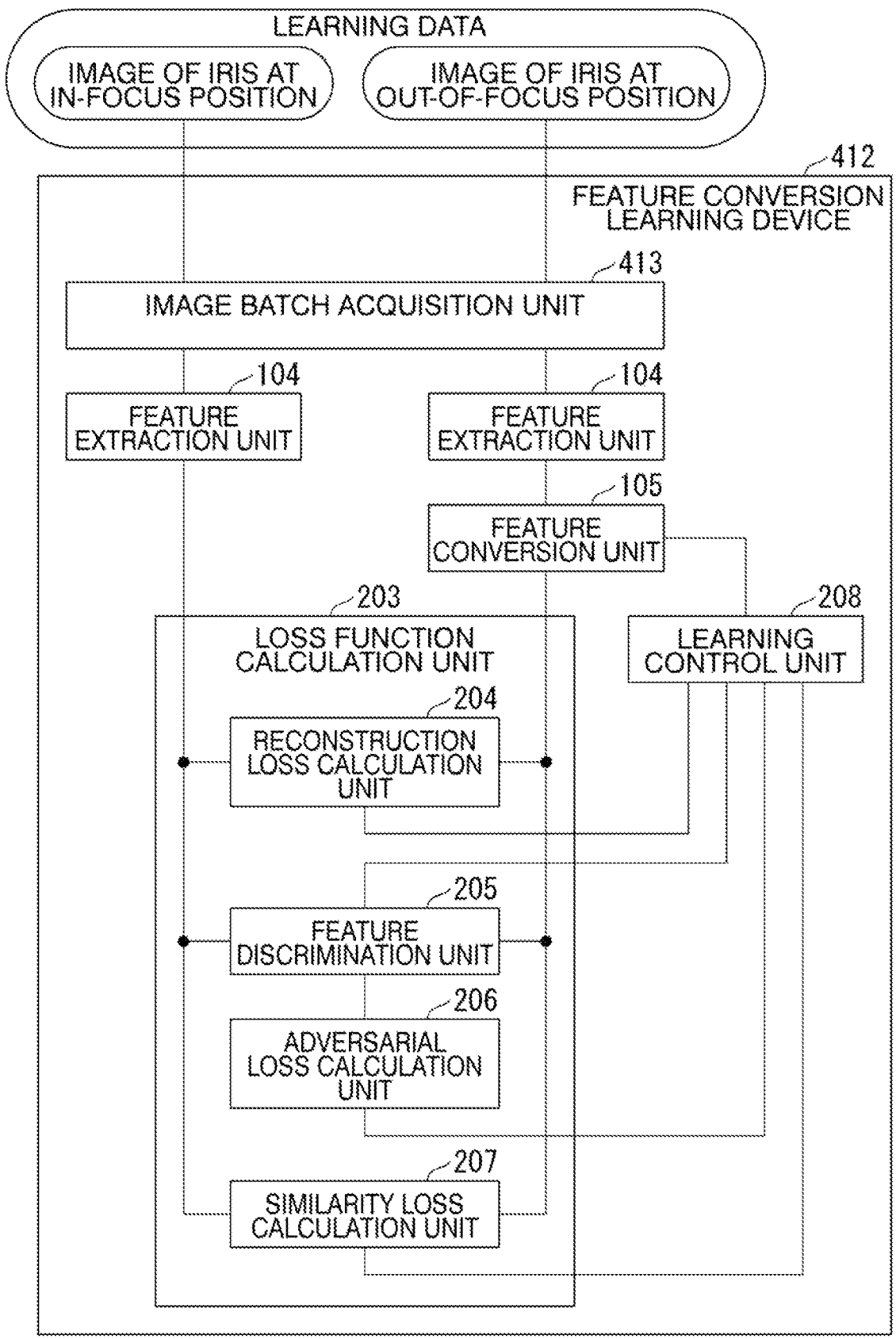
FIG. 20 is a diagram showing an example of a configuration of a feature conversion learning device according to a twelfth example embodiment.

FIG. 20 is a diagram showing an example of a configuration of a feature conversion learning device according to a twelfth example embodiment. A feature conversion learning device 412 of the twelfth example embodiment performs a learning process of the feature conversion unit 105 of the authentication device 411 of the eleventh example embodiment.

In the configuration shown in FIG. 20, the feature conversion learning device 412 includes an image batch acquisition unit 413, a feature extraction unit 104, a feature conversion unit 105, a loss function calculation unit 203, and a learning control unit 208. The loss function calculation unit 203 includes a reconstruction loss calculation unit 204, a feature discrimination unit 205, an adversarial loss calculation unit 206, and a similarity loss calculation unit 207.

A configuration of the feature conversion learning device 412 according to the twelfth example embodiment is similar to the configuration of the feature conversion learning device 412 according to the sixth example embodiment. Parts having similar functions in correspondence with the parts of FIG. 14 among the parts of FIG. 20 are denoted by the same reference numerals (104, 105, 203 to 208, 312, 412, and 413), and a detailed description thereof will be omitted here.

In the twelfth example embodiment, an image included in training data acquired by the feature conversion learning device 412 is different from that in the sixth example embodiment.

In the sixth example embodiment, the image batch acquisition unit 413 of the feature conversion learning device 412 acquires training data including a plurality of combinations of images of both an iris when glasses are worn and the iris of a naked eye, and class labels indicating correct classes in a process of classifying classes of these images.

On the other hand, in the twelfth example embodiment, the image batch acquisition unit 413 of the feature conversion learning device 412 acquires training data including a plurality of combinations of images of the iris whose image is out of focus, images of the iris whose image is in focus, and class labels indicating correct classes in a process of classifying classes of these images. Images of the same person and the same resolution are used as the image of the iris whose image is out of focus and the image of the iris whose image is in focus.

The image batch acquisition unit 413 corresponds to an example of an image acquisition unit. The image of the iris whose image is in focus included in the training data corresponds to an example of a first image and the image of the iris whose image is out of focus corresponds to an example of a second image.

In the twelfth example embodiment, the image batch acquisition unit 201 outputs each of an image of the iris whose image is out of focus and an image of the iris whose image is in focus to the feature extraction unit 104. The feature extraction unit 104 extracts a feature of the image of the iris whose image is out of focus and a feature of the image of the iris whose image is in focus.

The feature of the image of the iris whose image is in focus corresponds to an example of a first feature. The feature of the image of the iris whose image is out of focus corresponds to an example of a second feature.

The feature conversion unit 105 receives an input of the feature of the image of the iris whose image is out of focus and converts a feature so that a difference from the feature of the image of the iris whose image is in focus becomes small. A feature after conversion from the feature of the image of the iris whose image is out of focus corresponds to an example of a third feature. The loss function calculation unit 203 calculates a loss on the basis of the feature after conversion by the feature conversion unit 105 and the feature of the image of the iris whose image is in focus.

The learning control unit 208 updates a machine learning model parameter values of each of the feature conversion unit 105 and the feature discrimination unit 205 on the basis of the loss calculated by the loss function calculation unit 203. The learning control unit 208 updates the above-described machine learning model parameter value so that a difference between the feature after conversion by the feature conversion unit 105 and the feature of the image of the iris whose image is in focus becomes small.

As described above, the image batch acquisition unit 413 acquires the first image that is the image of the iris whose image is in focus and the second image that is the image of the iris whose image is out of focus. The feature extraction unit 104 extracts the first feature that is the feature of the first image and the second feature that is the feature of the second image. The feature conversion unit 105 converts the second feature into the third feature. The learning control unit 208 causes the feature conversion unit 105 to learn a feature conversion method on the basis of a result of comparing the first feature with the third feature.

The feature conversion learning device 412 according to the twelfth example embodiment can cause the feature conversion unit 105 to perform learning so that a conversion process in which the feature of the image of the iris whose image is out of focus is closer to the feature of the image of the iris whose image is in focus is performed. The authentication device 411 is expected to be able to perform iris authentication with relatively high accuracy even if an image out of focus is used as an authentication target image by performing authentication using the feature conversion unit 105.

Thirteenth Example Embodiment

Figure 21:
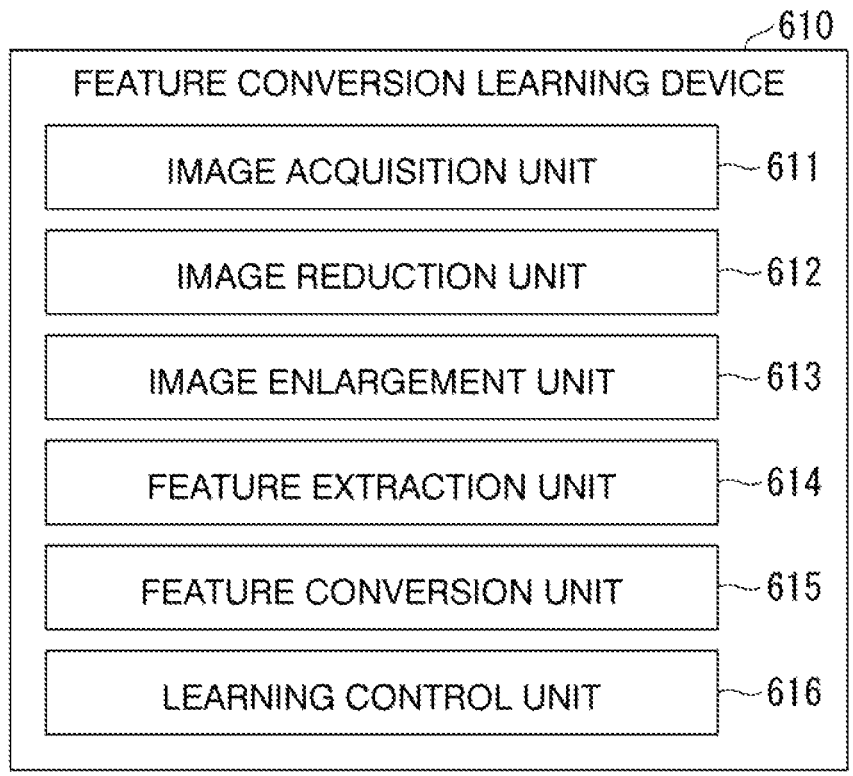
FIG. 21 is a diagram showing an example of a configuration of a feature conversion learning device according to a thirteenth example embodiment.

FIG. 21 is a diagram showing an example of a configuration of a feature conversion learning device according to a thirteenth example embodiment. In the configuration shown in FIG. 21, a feature conversion learning device 610 includes an image acquisition unit 611, an image reduction unit 612, an image enlargement unit 613, a feature extraction unit 614, a feature conversion unit 615, and a learning control unit 616.

In such a configuration, the image acquisition unit 611 acquires a first image. The image reduction unit 612 reduces the first image to a second image having lower resolution than the first image. The image enlargement unit 613 enlarges the second image to a third image having the same resolution as the first image. The feature extraction unit 614 extracts a first feature that is a feature of the first image and a second feature that is a feature of the third image. The feature conversion unit 615 converts the second feature into a third feature. The learning control unit 616 causes the feature conversion unit 615 to learn a feature conversion method on the basis of a result of comparing the first feature with the third feature.

The image acquisition unit 611 corresponds to an example of an image acquisition means. The image reduction unit 612 corresponds to an example of an image reduction means. The image enlargement unit 613 corresponds to an example of an image enlargement means. The feature extraction unit 614 corresponds to an example of a feature extraction means. The feature conversion unit 615 corresponds to an example of a feature conversion means. The learning control unit 616 corresponds to an example of a learning control means.

In the feature conversion learning device 610, the feature conversion unit 615 can cause a feature of an image obtained by enlarging a reduced image to be closer to a feature of a high-resolution image by performing a learning process of the feature conversion unit 615. The authentication device using the feature conversion unit 615 whose learning process is completed is expected to perform authentication with relatively high accuracy even if a low-resolution image is input.

Fourteenth Example Embodiment

Figure 22:
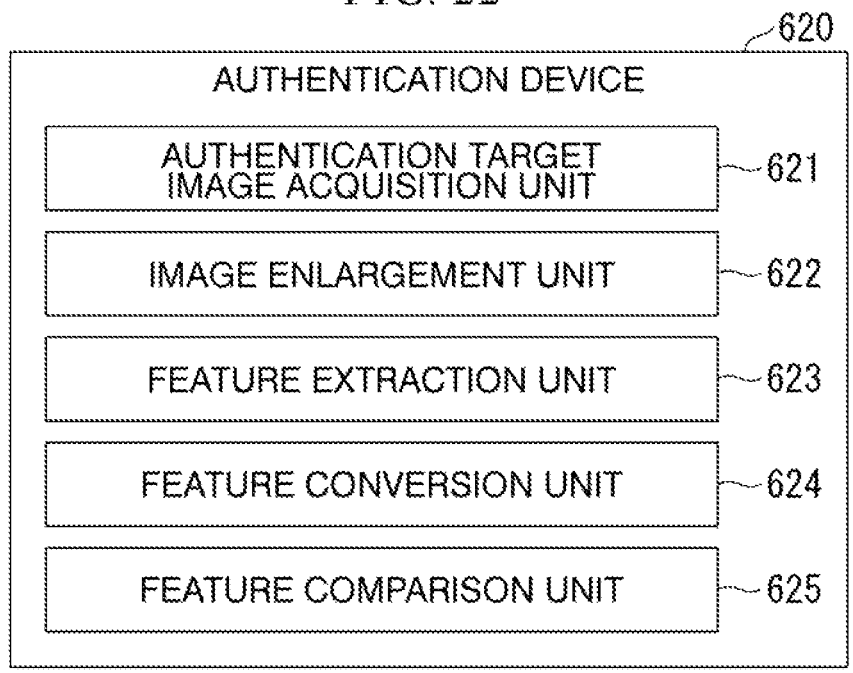
FIG. 22 is a diagram showing an example of a configuration of an authentication device according to a fourteenth example embodiment.

FIG. 22 is a diagram showing an example of a configuration of an authentication device according to a fourteenth example embodiment. In the configuration shown in FIG. 22, an authentication device 620 includes an authentication target image acquisition unit 621, an image enlargement unit 622, a feature extraction unit 623, a feature conversion unit 624, and a feature comparison unit 625.

In such a configuration, the authentication target image acquisition unit 621 acquires an authentication target image. The image enlargement unit 622 enlarges the authentication target image. The feature extraction unit 623 extracts a feature of an image obtained by enlarging the authentication target image in a method that is the same as a feature extraction method for a comparative image having higher resolution than the authentication target image. The feature conversion unit 624 converts the feature of the image obtained by enlarging the authentication target image on the basis of a result of learning a feature conversion method using a loss function whose value decreases as a difference between a feature after conversion from a feature of a learning image and a feature of a deteriorated image enlarged after the learning image is reduced decreases. The feature comparison unit 625 compares a feature after conversion by the feature conversion unit 624 with a feature of the comparative image.

The authentication target image acquisition unit 621 corresponds to an example of an authentication target image acquisition means. The image enlargement unit 622 corresponds to an example of an image enlargement means. The feature extraction unit 623 corresponds to an example of a feature extraction means. The feature conversion unit 624 corresponds to an example of a feature conversion means. The feature comparison unit 625 corresponds to an example of a feature comparison means.

According to the authentication device 620, a feature capable of being compared with the feature of the comparative image that is a high-resolution image can be obtained as a feature of an authentication target image that is a low-resolution image by enlarging a low-resolution image, extracting a feature, and converting the extracted feature. According to the authentication device 620, in this respect, authentication can be performed even if the input image is a low-resolution image.

Also, according to the feature conversion performed by the feature conversion unit 624, the feature of the enlarged authentication target image is expected to be closer to a feature when the authentication target image is captured at higher resolution. According to the authentication device 620, in this respect, the authentication is expected to be able to be performed with high accuracy.

Also, according to the authentication device 620, iris authentication can be performed using a low-resolution image. Thereby, in the authentication device 620, face authentication and iris authentication can be used together using one face image without the need for a high-resolution camera, and improvement in the accuracy of authentication is expected.

Fifteenth Example Embodiment

Figure 23:
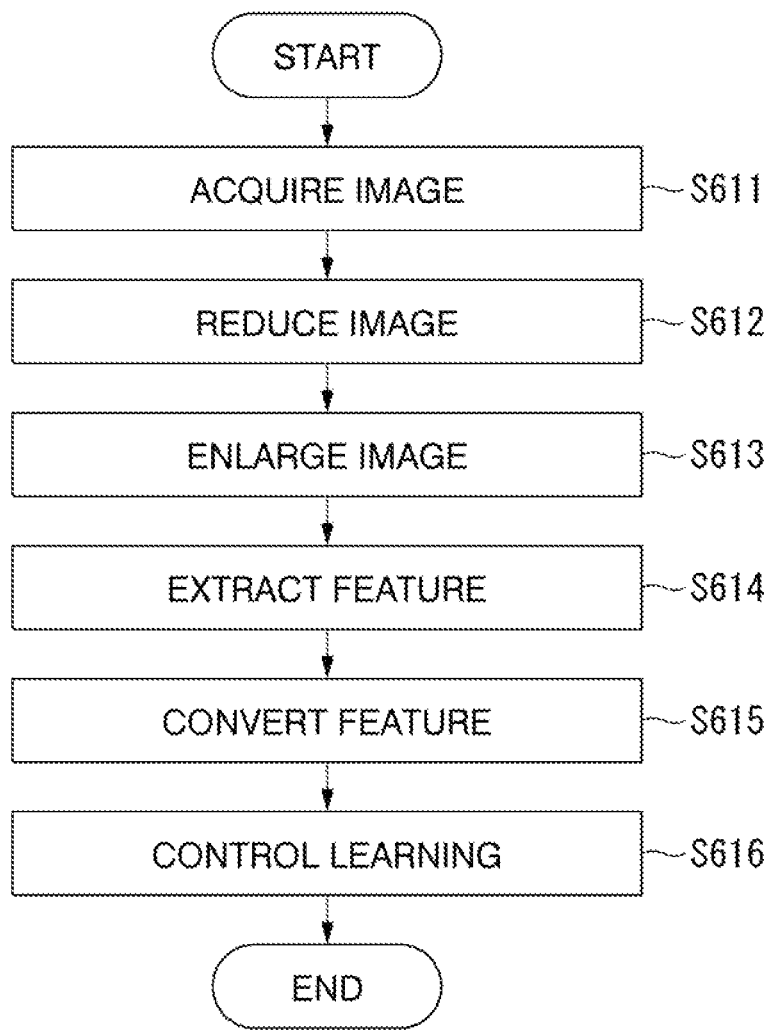
FIG. 23 is a flowchart showing an example of a processing procedure in a feature conversion learning method according to a fifteenth example embodiment.

FIG. 23 is a flowchart showing an example of a processing procedure in a feature conversion learning method according to a fifteenth example embodiment. The feature conversion learning method shown in FIG. 23 includes acquiring an image (step S611), reducing the image (step S612), enlarging the image (step S613), extracting a feature (step S614), converting the feature (step S615), and controlling learning (step S616).

In acquiring the image (step S611), a first image is acquired. In reducing the image (step S612), the first image is reduced to a second image having lower resolution than the first image. In enlarging the image (step S613), the second image is enlarged to a third image having the same resolution as the first image. In extracting the feature (step S614), a first feature that is a feature of the first image and a second feature that is a feature of the third image are extracted. In converting the feature (step S615), the second feature is converted into a third feature. In controlling the learning (step S616), a feature conversion method of converting the second feature into the third feature is learned on the basis of a result of comparing the first feature with the third feature.

According to the feature conversion learning method shown in FIG. 23, a feature conversion method is learned so that a feature of an image obtained by enlarging a reduced image can be closer to a feature of a high-resolution image according to feature conversion. In the authentication using the learned feature conversion method, authentication is expected to be performed with relatively high accuracy even if a low-resolution image is input.

Sixteenth Example Embodiment

Figure 24:
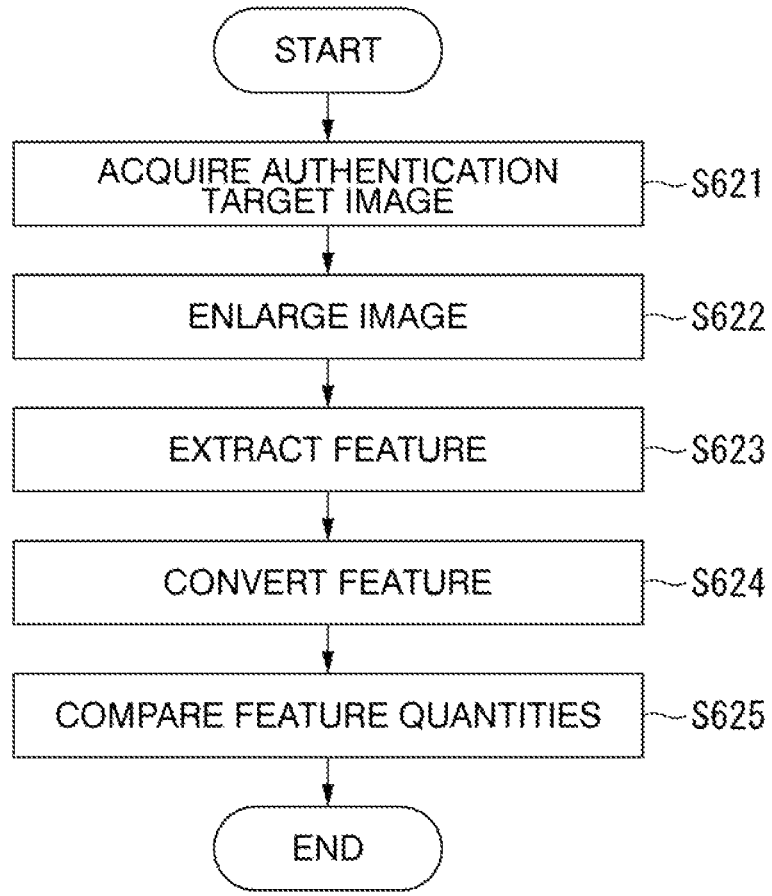
FIG. 24 is a flowchart showing an example of a processing procedure in an authentication method according to a sixteenth example embodiment.

FIG. 24 is a flowchart showing an example of a processing procedure in an authentication method according to a sixteenth example embodiment. The authentication method shown in FIG. 24 includes acquiring an authentication target image (step S621), enlarging the image (step S622), extracting a feature (step S623), converting the feature (step S624), and comparing feature quantities (step S625).

In acquiring the authentication target image (step S621), the authentication target image is acquired. In enlarging the image (step S622), the authentication target image is enlarged. In extracting the feature (step S623), a feature of an image obtained by enlarging the authentication target image is extracted in a method that is the same as a feature extraction method for a comparative image having higher resolution than the authentication target image. In converting the feature (step S624), the feature of the image obtained by enlarging the authentication target image is converted on the basis of a result of learning a feature conversion method using a loss function whose value decreases as a difference between a feature after conversion from a feature of a learning image and a feature of a deteriorated image enlarged after the learning image is reduced decreases. In comparing the feature quantities (step S625), a feature after conversion from the feature of the image obtained by enlarging the authentication target image is compared with a feature of the comparative image.

According to the authentication method shown in FIG. 24, a feature capable of being compared with the feature of the comparative image that is a high-resolution image can be obtained as a feature of an authentication target image that is a low-resolution image by enlarging a low-resolution image, extracting a feature, and converting the extracted feature. According to the authentication method shown in FIG. 24, in this respect, authentication can be performed even if the input image is a low-resolution image.

Also, according to the feature conversion, the feature of the enlarged authentication target image is expected to be closer to a feature when the authentication target image is captured at higher resolution. According to the authentication method shown in FIG. 24, in this respect, the authentication is expected to be able to be performed with high accuracy.

Also, according to the authentication method shown in FIG. 24, iris authentication can be performed using a low-resolution image. Thereby, in the authentication device 100, face authentication and iris authentication can be used together using one face image without the need for a high-resolution camera, and improvement in the accuracy of authentication is expected.

Seventeenth Example Embodiment

A configuration of an authentication device 620 according to a seventeenth example embodiment is similar to the configuration of the authentication device 620 according to the fourteenth example embodiment.

The authentication device 620 according to the seventeenth example embodiment further includes a feature discrimination unit configured to receive an input of a feature of a high-resolution image or a super-resolution feature and determine whether or not the input feature is the super-resolution feature. In such a configuration, the feature discrimination unit causes a feature conversion unit 615 to learn a feature conversion method on the basis of a loss function in which a loss decreases when the feature discrimination unit cannot distinguish between the feature converted by the feature conversion unit 615 and the other feature quantities.

Eighteenth Example Embodiment

A configuration of an authentication device 620 according to an eighteenth example embodiment is similar to the configuration of the authentication device 620 according to the fourteenth example embodiment or the seventeenth example embodiment.

In the authentication device 620 according to the eighteenth example embodiment, a learning control unit 616 causes a feature conversion unit 615 to learn a feature conversion method on the basis of a loss function in which a loss decreases as a similarity between a feature of a high-resolution image and a super-resolution feature increases.

Nineteenth Example Embodiment

A configuration of an authentication device 620 according to a nineteenth example embodiment is similar to the configuration of the authentication device 620 according to the fourteenth example embodiment, the seventeenth example embodiment, or the eighteenth example embodiment.

In the authentication device 620 according to the nineteenth example embodiment, the learning control unit 616 causes a feature conversion unit 615 to learn the feature conversion method on the basis of a loss function in which a loss becomes small when a class according to a class classification process on the basis of a super-resolution feature matches a correct class.

Twentieth Example Embodiment

A configuration of an authentication device 620 according to a twentieth example embodiment is similar to the configuration of the authentication device 620 according to the fourteenth example embodiment, the seventeenth example embodiment, the eighteenth example embodiment, or the nineteenth example embodiment.

In the authentication device 620 according to the twentieth example embodiment, an image reduction unit 612 generates a reduced image by reducing a high-resolution image to a size determined using a random number.

Figure 25:
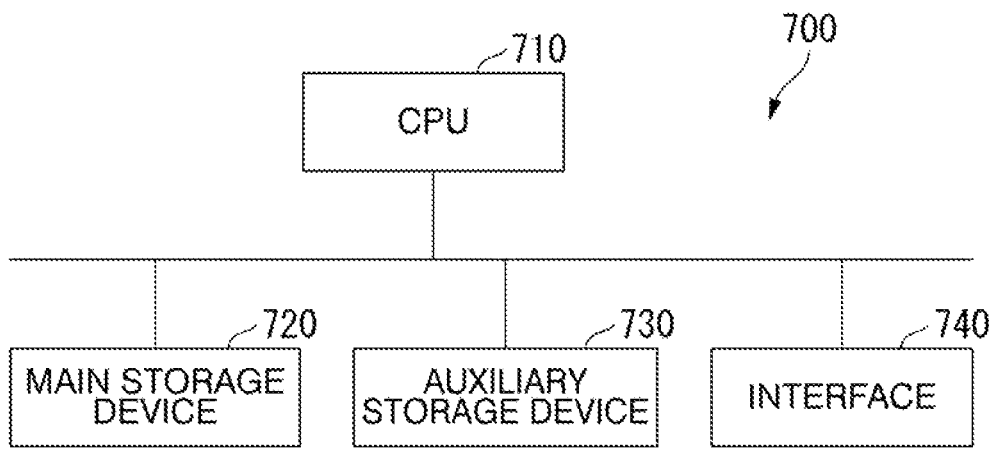
FIG. 25 is a schematic block diagram showing a configuration of a computer according to at least one example embodiment.

FIG. 25 is a schematic block diagram showing a configuration of a computer according to at least one example embodiment.

In the configuration shown in FIG. 25, a computer 700 includes a central processing unit (CPU) 710, a main storage device 720, an auxiliary storage device 730, and an interface 740.

One or more or some of the above-described authentication device 100, feature conversion learning device 200, authentication device 411, feature conversion learning device 412, feature conversion learning device 610, and authentication device 620 may be implemented in the computer 700. In this case, operations of the above-described processing units are stored in the auxiliary storage device 730 in the form of a program. The CPU 710 reads the program from the auxiliary storage device 730, loads the program into the main storage device 720, and executes the above-described process in accordance with the program. Also, the CPU 710 secures a storage area corresponding to each of the above-described storage units in the main storage device 720 in accordance with the program. Communication between each device and other devices is executed by performing communication in accordance with the control of the CPU 710 using the interface 740 having a communication function.

When the authentication device 100 is implemented in the computer 700, operations of the authentication target image acquisition unit 101, the comparative image acquisition unit 102, the image enlargement unit 103, the feature extraction unit 104, the feature conversion unit 105, and the feature comparison unit 106 are stored in the auxiliary storage device 730 in the form of a program. The CPU 710 reads the program from the auxiliary storage device 730, loads the program into the main storage device 720, and executes the above-described process in accordance with the program.

Also, the CPU 710 secures a storage area for the process of the authentication device 100 in the main storage device 720 in accordance with the program. Communication between the authentication device 100 and other devices is executed by performing communication in accordance with the control of the CPU 710 using the interface 740 having a communication function. The interaction between the authentication device 100 and the user is executed by displaying various types of images in accordance with the control of the CPU 710 and receiving an operation of the user using the interface 740 including a display device and an input device.

When the feature conversion learning device 200 is implemented in the computer 700, the image batch acquisition unit 201, the image reduction unit 202, the image enlargement unit 103, the feature extraction unit 104, the feature conversion unit 105, the loss function calculation unit 203, the learning control unit 208, and the operations of these units are stored in the auxiliary storage device 730 in the form of a program. The CPU 710 reads the program from the auxiliary storage device 730, loads the program into the main storage device 720, and executes the above-described process in accordance with the program.

Also, the CPU 710 secures a storage area for a process of the feature conversion learning device 200 in the main storage device 720 in accordance with the program. Communication between the feature conversion learning device 200 and other devices is executed by performing communication in accordance with the control of the CPU 710 using the interface 740 having a communication function. The interaction between the feature conversion learning device 200 and the user is executed by displaying various types of images in accordance with the control of the CPU 710 and receiving an operation of the user using the interface 740 including a display device and an input device.

When the authentication device 411 is implemented in the computer 700, the operations of the authentication target image acquisition unit 101, the comparative image acquisition unit 102, the feature extraction unit 104, the feature conversion unit 105, and the feature comparison unit 106 are stored in the auxiliary storage device 730 in the form of a program. The CPU 710 reads the program from the auxiliary storage device 730, loads the program into the main storage device 720, and executes the above-described process in accordance with the program.

Also, the CPU 710 secures a storage area for a process of the authentication device 411 in the main storage device 720 in accordance with the program. Communication between the authentication device 411 and other devices is executed by performing communication in accordance with the control of the CPU 710 using the interface 740 having a communication function. The interaction between the authentication device 411 and the user is executed by displaying various types of images in accordance with the control of the CPU 710 and receiving an operation of the user using the interface 740 including a display device and an input device.

When the feature conversion learning device 412 is implemented in the computer 700, the image batch acquisition unit 413, the feature extraction unit 104, the feature conversion unit 105, the loss function calculation unit 203, the learning control unit 208, and operations of these units are stored in the auxiliary storage device 730 in the form of a program. The CPU 710 reads the program from the auxiliary storage device 730, loads the program into the main storage device 720, and executes the above-described process in accordance with the program.

Also, the CPU 710 secures a storage area for a process of the feature conversion learning device 412 in the main storage device 720 in accordance with the program. Communication between the feature conversion learning device 412 and other devices is executed by performing communication in accordance with the control of the CPU 710 using the interface 740 having a communication function. The interaction between the feature conversion learning device 412 and the user is executed by displaying various types of images in accordance with the control of the CPU 710 and receiving an operation of the user using the interface 740 including a display device and an input device.

When the feature conversion learning device 610 is implemented in the computer 700, the operations of the image acquisition unit 611, the image reduction unit 612, the image enlargement unit 613, the feature extraction unit 614, the feature conversion unit 615, and the learning control unit 616 are stored in the auxiliary storage device 730 in the form of a program. The CPU 710 reads the program from the auxiliary storage device 730, loads the program into the main storage device 720, and executes the above-described process in accordance with the program.

Also, the CPU 710 secures a storage area for a process of the feature conversion learning device 610 in the main storage device 720 in accordance with the program. Communication between the feature conversion learning device 610 and other devices is executed by performing communication in accordance with the control of the CPU 710 using the interface 740 having a communication function. The interaction between the feature conversion learning device 610 and the user is executed by displaying various types of images in accordance with the control of the CPU 710 and receiving an operation of the user using the interface 740 including a display device and an input device.

When the authentication device 620 is implemented in the computer 700, the operations of the authentication target image acquisition unit 621, the image enlargement unit 622, the feature extraction unit 623, the feature conversion unit 624, and the feature comparison unit 625 are stored in the auxiliary storage device 730 in the form of a program. The CPU 710 reads the program from the auxiliary storage device 730, loads the program into the main storage device 720, and executes the above-described process in accordance with the program.

Also, the CPU 710 secures a storage area for a process of the authentication device 620 in the main storage device 720 in accordance with the program. Communication between the authentication device 620 and other devices is executed by performing communication in accordance with the control of the CPU 710 using the interface 740 having a communication function. The interaction between the authentication device 620 and the user is executed by displaying various types of images in accordance with the control of the CPU 710 and receiving an operation of the user using the interface 740 including a display device and an input device.

Also, a process of each part may be performed by recording a program for executing all or some of processes to be performed by the authentication device 100, the feature conversion learning device 200, the authentication device 411, the feature conversion learning device 412, the feature conversion learning device 610, and the authentication device 620 on a computer-readable recording medium and causing a computer system to read and execute the program recorded on the recording medium. Also, the "computer system" used here may include an operating system (OS) or hardware such as peripheral devices.

Also, the "computer-readable recording medium" refers to a storage device such as a flexible disc, a magneto-optical disc, a read-only memory (ROM), a portable medium such as a compact disc-ROM (CD-ROM), and a hard disk embedded in the computer system. Also, the above-described program may be a program for implementing some of the above-described functions. Further, the above-described program may implement the above-described function in combination with a program already recorded on the computer system.

Although example embodiments of the present disclosure have been described above in detail with reference to the drawings, specific configurations are not limited to the example embodiments and other designs and the like may also be included without departing from the scope of the present disclosure.

Although some or all of the above-described example embodiments can be described as in the following supplementary notes, the present disclosure is not limited to the following description.

(Supplementary Note 1)

A feature conversion learning device including:
an image acquisition means configured to acquire a first image;
an image reduction means configured to reduce the first image to a second image having lower resolution than the first image;
an image enlargement means configured to enlarge the second image to a third image having the same resolution as the first image;
a feature extraction means configured to extract a first feature that is a feature of the first image and a second feature that is a feature of the third image;
a feature conversion means configured to convert the second feature into a third feature; and
a learning control means configured to cause the feature conversion means to learn a feature conversion method based on a result of comparing the first feature with the third feature.

(Supplementary Note 2)

The feature conversion learning device according to supplementary note 1, further including a feature discrimination means configured to receive an input of the first feature or the third feature and determine whether or not the input feature is a feature obtained in a conversion process of the feature conversion means,
wherein the learning control means causes the feature conversion means to learn a feature conversion method based on a loss function in which a loss becomes small when the feature discrimination means is not able to distinguish between the feature converted by the feature conversion means and other feature quantities.

(Supplementary Note 3)

The feature conversion learning device according to supplementary note 1 or 2, wherein the learning control means causes the feature conversion means to learn the feature conversion method based on a loss function in which a loss decreases as a similarity between the first feature and the third feature increases.

(Supplementary Note 4)

The feature conversion learning device according to any one of supplementary notes 1 to 3, wherein the learning control means causes the feature conversion means to learn the feature conversion method based on a loss function in which a loss becomes small when a class according to a classification based on the third feature matches a correct class.

(Supplementary Note 5)

The feature conversion learning device according to any one of supplementary notes 1 to 4, wherein the image reduction means generates the second image by reducing the first image to a size determined using a random number.

(Supplementary Note 6)

The feature conversion learning device according to any one of supplementary notes 1 to 5, wherein the feature extraction means includes an attention processing means configured to perform a weighting process of emphasizing a feature corresponding to a specific part within an image of a feature extraction target.

(Supplementary Note 7)

The feature conversion learning device according to any one of supplementary notes 1 to 6, wherein the feature conversion means performs a feature conversion process on an intermediate feature generated by the feature extraction means.

(Supplementary Note 8)

An authentication device including:

an authentication target image acquisition means configured to acquire an authentication target image;

an image enlargement means configured to enlarge the authentication target image;

a feature extraction means configured to extract a feature of an image obtained by enlarging the authentication target image in a method that is the same as a feature extraction method for a comparative image having higher resolution than the authentication target image;

a feature conversion means configured to convert the feature of the image obtained by enlarging the authentication target image based on a result of learning a feature conversion method using a loss function whose value decreases as a difference between a feature after conversion from a feature of a learning image and a feature of a deteriorated image enlarged after the learning image is reduced decreases; and a feature comparison means configured to compare a feature after conversion by the feature conversion means with a feature of the comparative image.

(Supplementary Note 9)

A feature conversion learning device including:

an image acquisition means configured to acquire a first image that is an image of an iris of a naked eye and a second image that is an image of the iris when glasses are worn;

a feature extraction means configured to extract a first feature that is a feature of the first image and a second feature that is a feature of the second image;

a feature conversion means configured to convert the second feature into a third feature; and a learning control means configured to cause the feature conversion means to learn a feature conversion method based on a result of comparing the first feature with the third feature.

(Supplementary Note 10)

An authentication device including:

an authentication target image acquisition means configured to acquire an image of an iris when glasses are worn as an authentication target image;

a feature extraction means configured to extract a feature of the authentication target image in a method that is the same as a feature extraction method for a comparative image that is an image of the iris of a naked eye;

a feature conversion means configured to convert the feature of the authentication target image based on a result of learning a feature conversion method using a loss function whose value decreases as a difference between a feature after conversion from a feature of a first learning image that is an image of the iris when the glasses are worn and a feature of a second learning image that is an image of the iris of the naked eye decreases; and a feature comparison means configured to compare a feature after conversion by the feature conversion means with a feature of the comparative image.

(Supplementary Note 11)

A feature conversion learning device including:

an image acquisition means configured to acquire a first image that is an image of an iris acquired from the front and a second image that is an image of the iris acquired from an oblique angle;

a feature extraction means configured to extract a first feature that is a feature of the first image and a second feature that is a feature of the second image;

a feature conversion means configured to convert the second feature into a third feature; and a learning control means configured to cause the feature conversion means to learn a feature conversion method based on a result of comparing the first feature with the third feature.

(Supplementary Note 12)

An authentication device including:

an authentication target image acquisition means configured to acquire an image of an iris acquired from an oblique angle as an authentication target image;

a feature extraction means configured to extract a feature of the authentication target image in a method that is the same as a feature extraction method for a comparative image that is an image of the iris acquired from the front;

a feature conversion means configured to convert the feature of the authentication target image based on a result of learning a feature conversion method using a loss function whose value decreases as a difference between a feature after conversion from a feature of a first learning image that is an image of the iris acquired from an oblique angle and a feature of a second learning image that is an image of the iris acquired from the front decreases; and a feature comparison means configured to compare a feature after conversion by the feature conversion means with a feature of the comparative image.

(Supplementary Note 13)

A feature conversion learning device including:

an image acquisition means configured to acquire a first image that is an image of an iris acquired with light other than visible light and a second image that is an image of the iris acquired with the visible light;

a feature extraction means configured to extract a first feature that is a feature of the first image and a second feature that is a feature of the second image;

a feature conversion means configured to convert the second feature into a third feature; and a learning control means configured to cause the feature conversion means to learn a feature conversion method based on a result of comparing the first feature with the third feature.

(Supplementary Note 14)

An authentication device including:

an authentication target image acquisition means configured to acquire an image of an iris acquired with visible light as an authentication target image;

a feature extraction means configured to extract a feature of the authentication target image in a method that is the same as a feature extraction method for a comparative image that is an image of the iris acquired with light other than the visible light;

a feature conversion means configured to convert the feature of the authentication target image based on a result of learning a feature conversion method using a loss function whose value decreases as a difference between a feature after conversion from a feature of a first learning image that is an image of the iris acquired with the visible light and a feature of a second learning image that is an image of the iris acquired with light other than the visible light decreases; and
a feature comparison means configured to compare a feature after conversion by the feature conversion means with a feature of the comparative image.

(Supplementary Note 15)

A feature conversion learning device including:
an image acquisition means configured to acquire a first image that is an image of an iris acquired in an in-focus state and a second image that is an image of the iris acquired in an out-of-focus state;
a feature extraction means configured to extract a first feature that is a feature of the first image and a second feature that is a feature of the second image;
a feature conversion means configured to convert the second feature into a third feature; and
a learning control means configured to cause the feature conversion means to learn a feature conversion method based on a result of comparing the first feature with the third feature.

(Supplementary Note 16)

An authentication device including:
an authentication target image acquisition means configured to acquire an image of an iris acquired in an out-of-focus state as an authentication target image;
a feature extraction means configured to extract a feature of the authentication target image in a method that is the same as a feature extraction method for a comparative image that is an image of the iris acquired in an in-focus state;
a feature conversion means configured to convert the feature of the authentication target image based on a result of learning a feature conversion method using a loss function whose value decreases as a difference between a feature after conversion from a feature of a first learning image that is an image of the iris acquired in the out-of-focus state and a feature of a second learning image that is an image of the iris acquired in the in-focus state decreases; and
a feature comparison means configured to compare a feature after conversion by the feature conversion means with a feature of the comparative image.

(Supplementary Note 17)

A feature conversion learning method comprising:
acquiring a first image;
reducing the first image to a second image having lower resolution than the first image;
enlarging the second image to a third image having the same resolution as the first image;
extracting a first feature that is a feature of the first image and a second feature that is a feature of the third image;
converting the second feature into a third feature; and
learning a feature conversion method of converting the second feature into the third feature based on a result of comparing the first feature with the third feature.

(Supplementary Note 18)

An authentication method comprising:
acquiring an authentication target image;
enlarging the authentication target image;
extracting a feature of an image obtained by enlarging the authentication target image in a method that is the same as a feature extraction method for a comparative image having higher resolution than the authentication target image;
converting the feature of the image obtained by enlarging the authentication target image based on a result of learning a feature conversion method using a loss function whose value decreases as a difference between a feature after conversion from a feature of a learning image and a feature of a deteriorated image enlarged after the learning image is reduced decreases; and
comparing a feature after conversion from the feature of the image obtained by enlarging the authentication target image with a feature of the comparative image.

(Supplementary Note 19)

A recording medium recording a program for causing a computer to:
acquire a first image;
reduce the first image to a second image having lower resolution than the first image;
enlarge the second image to a third image having the same resolution as the first image;
extract a first feature that is a feature of the first image and a second feature that is a feature of the third image;
convert the second feature into a third feature; and
learn a feature conversion method of converting the second feature into the third feature based on a result of comparing the first feature with the third feature.

(Supplementary Note 20)

A recording medium recording a program for causing a computer to:
acquire an authentication target image;
enlarge the authentication target image;
extract a feature of an image obtained by enlarging the authentication target image in a method that is the same as a feature extraction method for a comparative image having higher resolution than the authentication target image;
convert the feature of the image obtained by enlarging the authentication target image based on a result of learning a feature conversion method using a loss function whose value decreases as a difference between a feature after conversion from a feature of a learning image and a feature of a deteriorated image enlarged after the learning image is reduced decreases; and
compare a feature after conversion from the feature of the image obtained by enlarging the authentication target image with a feature of the comparative image.

INDUSTRIAL APPLICABILITY

The present disclosure may be applied to a feature conversion learning device, an authentication device, a feature conversion learning method, an authentication method, and a recording medium.

REFERENCE SIGNS LIST 100, 411, 620 Authentication device
101 Authentication target image acquisition unit
102 Comparative image acquisition unit
103, 613, 622 Image enlargement unit
104, 114, 614, 623 Feature extraction unit
105, 615, 624 Feature conversion unit
106, 625 Feature comparison unit
114a First feature extraction unit
114b Second feature extraction unit
200, 412, 610 Feature conversion learning device
201, 413 Image batch acquisition unit
202, 612 Image reduction unit
203 Loss function calculation unit
204 Reconstruction loss calculation unit
205 Feature discrimination unit
206 Adversarial loss calculation unit 207 Similarity loss calculation unit
208, 616 Learning control unit
301, 303, 304 Attention processing unit
302 Attention block
311, 311a, 311b Two-dimensional convolution calculation unit
312 Function calculation unit
313 Multiplication unit
321 Channel separation unit
322 Channel coupling unit
341 Attention map acquisition unit
611 Image acquisition unit

The invention claimed is:

1. An authentication device comprising:
a memory configured to store instructions; and
a processor configured to execute the instructions to:
acquire an authentication target image;
enlarge the authentication target image;
extract a feature of an image obtained by enlarging the authentication target image in a method that is the same as a feature extraction method for a comparative image having higher resolution than the authentication target image;
convert the feature of the image obtained by enlarging the authentication target image based on a result of learning a feature conversion method using a loss function whose value decreases as a difference between a feature after conversion from a feature of a learning image and a feature of a deteriorated image enlarged after the learning image is reduced decreases; and
compare a feature after conversion with a feature of the comparative image.

2. A feature conversion learning device comprising:
a memory configured to store instructions; and
a processor configured to execute the instructions to:
acquire a first image;
reduce the first image to a second image having lower resolution than the first image;
enlarge the second image to a third image having the same resolution as the first image;
extract a first feature that is a feature of the first image and a second feature that is a feature of the third image;
convert the second feature into a third feature; and
learn a feature conversion method based on a result of comparing the first feature with the third feature.

3. The feature conversion learning device according to claim 2, wherein the processor is configured to execute the instructions to:
receive an input of the first feature or the third feature and determine whether or not the input feature is a converted feature, and
learn a feature conversion method based on a loss function in which a loss becomes small when being not able to distinguish between the converted feature and other feature quantities.

4. The feature conversion learning device according to claim 2, wherein the processor is configured to execute the instructions to learn the feature conversion method based on a loss function in which a loss decreases as a similarity between the first feature and the third feature increases.

5. The feature conversion learning device according to claim 2, wherein the processor is configured to execute the instructions to: learn the feature conversion method based on a loss function in which a loss becomes small when a class according to a classification based on the third feature matches a correct class.

6. The feature conversion learning device according to claim 2, wherein the processor is configured to execute the instructions to: generate the second image by reducing the first image to a size determined using a random number.

7. The feature conversion learning device according to claim 2, wherein the processor is configured to execute the instructions to: perform a weighting process of emphasizing a feature corresponding to a specific part within an image of a feature extraction target.

8. The feature conversion learning device according to claim 2, wherein the processor is configured to execute the instructions to: perform a feature conversion process on a generated intermediate feature.

9. A feature conversion learning method comprising:
acquiring a first image;
reducing the first image to a second image having lower resolution than the first image;
enlarging the second image to a third image having the same resolution as the first image;
extracting a first feature that is a feature of the first image and a second feature that is a feature of the third image;
converting the second feature into a third feature; and
learning a feature conversion method of converting the second feature into the third feature based on a result of comparing the first feature with the third feature.

\* \* \* \* \*